United States Patent [19]

Hamano et al.

[11] Patent Number: 4,730,708
[45] Date of Patent: Mar. 15, 1988

[54] IDLING CONTROL METHOD AND SYSTEM FOR INTERNAL COMBUSTION ENGINE PROVIDING ANTI CREEP ACTION

[75] Inventors: Yukio Hamano; Yuji Kashihara, both of Toyota, Japan

[73] Assignee: Toyota Jidosha Kabushiki Kaisha, Toyota, Japan

[21] Appl. No.: 868,513

[22] Filed: May 30, 1986

[30] Foreign Application Priority Data

| May 30, 1985 | [JP] | Japan | 60-117559 |
| Apr. 11, 1986 | [JP] | Japan | 61-083748 |
| Apr. 11, 1986 | [JP] | Japan | 61-083749 |

[51] Int. Cl.$^4$ ............................................. B60K 41/22
[52] U.S. Cl. ........................... 192/0.033; 192/0.076; 192/0.092; 192/3.58; 192/103 F; 192/109 F; 74/866
[58] Field of Search ............... 192/0.032, 0.033, 0.052, 192/0.07, 0.075, 0.076, 0.092, 0.096, 3.58, 103 F, 109 F; 74/865, 866

[56] References Cited

U.S. PATENT DOCUMENTS

| 4,513,638 | 4/1985 | Nishikawa et al. | 74/866 |
| 4,584,908 | 4/1986 | Nishikawa et al. | 74/866 |
| 4,603,604 | 8/1986 | Nishikawa et al. | 192/0.076 X |
| 4,625,589 | 12/1986 | Nishikawa et al. | 74/866 |

FOREIGN PATENT DOCUMENTS

| 21047 | 2/1983 | Japan | 74/865 |
| 193953 | 11/1983 | Japan | 74/865 |
| 168944 | 9/1985 | Japan | 74/866 |
| 2147066 | 5/1985 | United Kingdom | 74/866 |

*Primary Examiner*—Rodney H. Bonck
*Assistant Examiner*—Richard M. Lorence
*Attorney, Agent, or Firm*—Oblon, Fisher, Spivak, McClelland & Maier

[57] ABSTRACT

A vehicle includes an engine and an automatic transmission which has a fluid torque converter, a forward clutch, and a manual range setting valve. Idling control for providing anti creep control is performed by, during engine idling time while the manual range setting valve is set to a forward driving range and the vehicle is substantially stationary, reducing the engagement pressure of the forward clutch by reducing the actuating pressure provided to it. A rotational speed associated with the fluid torque converter is detected, and the actuating pressure provided to the forward clutch is controlled so that the rotational speed associated with the fluid torque converter does not drop below a certain rotational speed value. Thereby good anti creep control is provided. A system is also disclosed for performing the method.

30 Claims, 9 Drawing Figures

IDLING CONTROL METHOD AND SYSTEM FOR INTERNAL COMBUSTION ENGINE PROVIDING ANTI CREEP ACTION

BACKGROUND OF THE INVENTION

The present invention relates to an idling control system for an automatic transmission, and more particularly relates to such an idling control system for an automatic transmission which provides improved anti creep characteristics for keeping the vehicle at rest and for starting off the vehicle from rest and particularly has a smooth starting off action and is substantially immune from undesirable performance variations due to constructional variations within manufacturing tolerances.

The present patent application has been at least partly prepared from material included in Japanese Patent Applications Ser. Nos. 60-117559, 61-083748, and 61-083749, which were filed by an applicant the same as the assignee or entity owed duty of assignment of the present patent application, and the present application hereby incorporates into itself by reference the texts of said Japanese Patent Applications and the claims and the drawings thereof; copies are appended to the present application.

There is a conventional type of automatic transmission for a vehicle which comprises a fluid torque converter which receives output of rotational power from an internal combustion engine and which transmits said power with a certain degree of torque amplification and with a certain degree of slippage to a gear transmission mechanism which can selectively provide any one of a plurality of forward speed stages (gearing ratios) between its power input shaft thus connected to said torque converter and its power output shaft connected to the driven road wheels of the vehicle so as to transmit rotational power thereto. Such a torque converter provides an amount of torque amplification and an amount of slippage both of which vary as the rotational speed of the input member (or pump impeller) of said torque converter varies, according to determinate performance characteristics thereof. And the gear transmission mechanism, which typically comprises a plurality of selectively engagable gear trains, is set in a determinate way to one or the other of said plurality of forward speed stages, according to the current values of various operational parameters of the internal combustion engine and of the vehicle incorporating it, said operational parameters including but not being limited to engine load (usually taken as being represented by throttle opening amount), vehicle road speed, and the one of various shift ranges such as "D" or drive range, "S" or second range, and "L" or low range currently selected on a manually controlled range selection means provided to the vehicle. And the manner in which said plurality of forward speed stages is thus selected between according to the current values of said vehicle operational parameters is conventionally described by one or more shift diagrams, typically one for each one of such forward shift ranges which encompasses more than one speed stage.

When the abovementioned manual range setting means is set to "D" or drive range or some other forward driving range and the vehicle speed is substantially zero, i.e. the vehicle is substantially at rest, and further the internal combustion engine is substantially idling: then, in view of the desirability of maintaining a capability for relatively rapid starting off of the vehicle from this stopped condition, it is usually practiced not to put the gear transmission mechanism into a neutral condition in which it is incapable of transmitting rotational power between its power input shaft and its power output shaft, but instead typically said gear transmission mechanism is left as engaged to its first speed stage, i.e. its speed stage in which it provides a maximum reduction gearing ratio between its power input shaft and its power output shaft. Thereby a rapid response is available when the accelerator pedal of the vehicle is pressed in order to move off from rest, and the transmission is maintained in a state ready to transmit rotational power from the engine to the wheels of the vehicle, with the torque converter providing relatively great slippage and transmitting a relatively small amount of torque at this time due to the relatively low rotational speed of its power input member which is being driven by the internal combustion engine which is idling. When the accelerator pedal is in fact thus depressed by the foot of the vehicle driver, the rotational speed of the power output member of the engine (typically its crankshaft) rises, and accordingly the rotational speed of the power input member of the torque converter rises, and thereby the torque converter is caused to transmit substantially more torque, i.e. to provide less slippage between its power input member and its power output member. This increased torque is immediately transmitted by the gear transmission mechanism, since it is being maintained as engaged to its first speed stage as explained above, to the driven road wheels of the vehicle; and thereby the vehicle is caused to move off from rest.

This leaving of the gear transmission mechanism engaged to its first speed stage during the engine idling vehicle stopped condition produces the consequence of being liable to still transmit some substantial amount of torque from the torque converter through said gear transmission mechanism to the driven road wheels of the vehicle at this time. If not counteracted, this produces so called creep of the vehicle, and indirectly leads to engine idling vibration. Further, it becomes necessary for the driver of the vehicle to press relatively hard on the brakes of the vehicle while the vehicle is thus stopped, as for example at a traffic light or the like, in order positively to prevent forward motion of the vehicle. And the drag of the torque converter on the internal combustion engine causes the fuel economy of the engine to be bad, and furthermore the transmission fluid in said torque converter tends to become hot, which can in some cases lead to an overall overheating problem for the vehicle as a whole.

This type of gear transmission mechanism typically includes a clutch which is generally called a forward clutch which is engaged when and only when the gear transmission mechanism is engaged to one of its forward speed stages, i.e. is providing forward driving to the vehicle. This forward clutch typically comprises two sets of friction elements connected to and two members which it selectively engages together, and is typically actuated by said two sets of friction elements being pressed together by a hydraulic servo device which has a pressure chamber for its actuation. Thus, the forward clutch is engaged when hydraulic fluid pressure is supplied to said pressure chamber of said hydraulic servo device thereof, with the engagement pressure between said sets of friction elements of said clutch and accordingly its torque transmission capability increasing the greater is the pressure value of said hydraulic fluid pressure. Accordingly, the assignee of the present patent application, who is also the applicant of the Japanese patent application of which the priority is being claimed for the present application, has proposed—in Japanese Patent Applications Ser. Nos. 41-18128 (1966), 56-117742 (1981), 57-10444 (1982), 57-75829 (1982), 57-115087 (1982), and 59-176300 (1984), the first of which has been published as Japanese Patent Publication Ser. No. 47-19962 (1972), and the next listed ones of which have been respectively laid open as Japanese Patent Laying Open Publications Ser. Nos. 56-21047 (1981), 58-128552 (1983), 58-193953 (1983), and 59-6454 (1984), and none of which is it intended hereby to admit as prior art to the present patent application except to the extent otherwise required by applicable law—that, in the above described condition when the engine of the vehicle is substantially in the idling condition and the vehicle speed is substantially zero, the hydraulic fluid pressure, which is thus being supplied as an actuating pressure to a frictional engaging device of the gear transmission mechanism which is of the so called forward clutch type which is engaged when and only when the gear transmission mechanism is engaged to one of its forward speed stages, should be substantially decreased. Doing this allows said forward clutch to slip somewhat during this engine idling vehicle stopped operational condition, so that the gear transmission mechanism no longer transmits torque to any substantial extent while the vehicle is stopped. This means that substantially no vehicle creep takes place, and thus there is no requirement for the driver to press on the vehicle brake to maintain the vehicle in the stationary state. Further, the occurrence of idling vibration is made much less likely. The fuel economy of the vehicle is also improved. Also, since there is substantially less churning up of the transmission hydraulic fluid in the fluid torque converter, the problem of heating up of said torque converter is substantially overcome. The actuating pressure for the forward clutch can be quickly raised to an appropriate operational level when the accelerator pedal of the vehicle is depressed in order to start off the vehicle from rest, and so the provision of this anti creep device does not make the obtaining of a good response for starting off the vehicle much more difficult.

A problem that has occurred with such a system is as follows. In the above outlined construction, during the condition when the engine of the vehicle is substantially in the idling condition and the vehicle speed is substantially zero, the actuating hydraulic fluid pressure for the forward clutch is ideally reduced to a so called waiting value, which should be as high as possible short of causing said forward clutch to provide substantial torque transmission, so that said forward clutch is ready to be rapidly returned to the engaged state by moderate increase of said actuating pressure. However, this so called waiting value of actuating pressure is not defined with absolute accuracy when the transmission is being manufactured, i.e. is not always quite the same for each transmission unit of a series that are being made by mass production, and further does not always remain constant even for one transmission unit when operational conditions vary. This is because of the effect of inevitable variances from ideal specifications caused by manufacturing tolerances in, for example, the stroke of the piston of the hydraulic actuator for the forward clutch, and the strength of the return spring for said hydraulic actuator. Further, variation in the temperature of the transmission can cause these parameters to vary during operation, and can also cause fluctuations in the effectiveness of, for example, the sealing effectiveness of seal rings included in the hydraulic actuator. Because of all this, the ideal value of the waiting value for this forward clutch actuator hydraulic pressure varies. Since the prior arts outlined above have not been able to compensate for such variation, it has been required to set said forward clutch actuator waiting pressure to some compromise value, which typically has been on the low side, since error on the high side leads to undesirably high transmission creepage; but this has inevitably meant that in practice the desirable results obtained by the anti creep control system not setting the forward clutch waiting pressure to zero, particularly quick engagement when the vehicle is to be moved off from rest, have been largely lost.

Another problem that has arisen in this connection is that of preventing snatching of the transmission. If the forward clutch is not quickly enough engaged when anti creep action is to be terminated, then there is a risk that the torque converter revolution speed will suddenly rise up and then meet with a snatch, thus suffering an unpleasant shock. And the proper setting of the anti creep control system actually depends upon whether or not various engine ancillary devices, such as an air conditioner pump, an alternator, and the like, are operating or not, as well as upon engine warming up state and other engine operational parameters.

SUMMARY OF THE INVENTION

Accordingly, it is the primary object of the present invention to provide an idling control system of the type outlined above for such an automatic transmission with an anti creep system, which can function accurately and effectively to provide proper anti creep action even when operational conditions change.

It is a further object of the present invention to provide such an idling control system for an automatic transmission, which can be reliably made by mass production techniques.

It is a further object of the present invention to provide such an idling control system for an automatic transmission, which provides a good anti creep action.

It is a further object of the present invention to provide such an idling control system for an automatic transmission, which provides a good starting off feeling.

It is a further object of the present invention to provide such an idling control system for an automatic transmission, which ensures that no particularly hard brake application by the vehicle driver is required during the vehicle stationary engine idling condition, in order to prevent the vehicle moving off from rest when it is not desired for it to do so.

It is a further object of the present invention to provide such an idling control system for an automatic transmission, which keeps engine fuel economy high.

It is a further object of the present invention to provide such an idling control system for an automatic transmission, which helps to prevent engine overheating.

It is a further object of the present invention to provide such an idling control system for an automatic transmission, which helps to prevent engine idling vibration.

It is a yet further object of the present invention to provide such an idling control system for an automatic transmission, which can prevent engine snatch.

It is a yet further object of the present invention to provide such an idling control system for an automatic transmission, which can provide quick engine take up of clutch engagement.

It is a yet further object of the present invention to provide such an idling control system for an automatic transmission, which can provide good operation in various engine operational conditions.

According to the most general method aspect of the present invention, these and other objects are attained by, for an engine comprised in a vehicle which further comprises an automatic transmission comprising a fluid torque converter, a forward clutch, and a manual range setting valve: a method of idling control for providing anti creep control, wherein, during engine idling time while said manual range setting valve is set to a forward driving range and said vehicle is substantially stationary, the engagement pressure of said forward clutch is reduced by reducing an actuating pressure provided to said forward clutch, and wherein: a rotational speed associated with said fluid torque converter is detected; and: said actuating pressure provided to said forward clutch is controlled so that said rotational speed associated with said fluid torque converter does not drop below a certain rotational speed value; and, according to the most general apparatus aspect of the present invention, these and other objects are attained by, for an engine comprised in a vehicle which further comprises an automatic transmission comprising a fluid torque converter, a forward clutch, and a manual range setting valve: a system for idling control for providing anti creep control, comprising: a means for, during engine idling time while said manual range setting valve is set to a forward driving range and said vehicle is substantially stationary, reducing the engagement pressure of said forward clutch by reducing an actuating pressure provided to said forward clutch; a means for detecting a rotational speed associated with said fluid torque converter; and: a means for controlling said actuating pressure provided to said forward clutch so that said rotational speed associated with said fluid torque converter does not drop below a certain rotational speed value.

According to such a method and such a structure, the engine idling control is performed by monitoring the rotational speed associated with the fluid torque converter, so that it is ensured that no substantial torque is transmitted through the forward clutch, while at the same time the forward clutch actuating pressure is held as high as possible consistent with such a condition. Thus, as compared with the above outlined prior arts, the actuating pressure for the forward clutch is kept relatively high—indeed, as high as practicable for any particular engine operational conditions—and thereby as fast a take up of clutch engagement as possible is made available. Accordingly, a good anti creep action is made available, and the automatic transmission is ensured of a good starting off feeling, while still no particularly hard brake application by the vehicle driver is required during the vehicle stationary engine idling condition, in order to prevent the vehicle moving off from rest when it is not desired for it to do so. Thus, this idling control system for an automatic transmission keeps engine fuel economy high, and helps to prevent engine overheating, as well as helping to prevent engine idling vibration. Further, because of the adaptive nature of this idling control system, variations in performance characteristics of the automatic transmission due to alterations in operational conditions are compensated for, as also are manufacturing variations. Accordingly, this idling control system has good producability.

Further, according to particular specializations of the present invention, the above specified and other objects are more particularly attained by a method as outlined above, wherein said rotational speed associated with said fluid torque converter is detected when said forward clutch is substantially disengaged, and said certain rotational speed value is determined based thereon; and by a system for idling control as outlined above, further comprising a means for detecting said rotational speed associated with said fluid torque converter when said forward clutch is substantially disengaged, and for determining said certain rotational speed value based thereon.

According to these specializations, the target certain rotational speed value is determined variably beforehand with the forward clutch disengaged, so that during anti creep action the forward clutch engaging pressure can reliably be set as high as possible without causing creep, i.e. at the maximum so that the forward clutch does not transmit substantial torque. Thereby, creep is prevented, but nevertheless there is substantially no delay in take up of the engagement of the forward clutch, and no startoff snatch or shock occurs.

Further, according to other particular specializations of the present invention, the above specified and other objects are more particularly attained by a method as outlined above, wherein, during anti creep control, first said forward clutch is substantially disengaged, said rotational speed associated with said fluid torque converter is detected, and said certain rotational speed value is determined based thereon, and subsequently said actuating pressure provided to said forward clutch is controlled so that said rotational speed associated with said fluid torque converter does not drop below said certain rotational speed value; and by a system as outlined above, further comprising a means for, during anti creep control, first substantially disengaging said forward clutch and detecting said rotational speed associated with said fluid torque converter for said certain rotational speed value to be determined based thereon by said means for doing so, and subsequently controlling said actuating pressure provided to said forward clutch so that said rotational speed associated with said fluid torque converter does not drop below said certain rotational speed value.

According to these specializations, during anti creep action, the target certain rotational speed value is determined by first disengaging the forward clutch and then measuring the actual rotational speed associated with said fluid torque converter, and subsequently the forward clutch engaging pressure is adjusted by being set as high as possible without causing creep, i.e. at the maximum so that the forward clutch does not transmit substantial torque. Thereby, creep is even more effectively prevented.

BRIEF DESCRIPTION OF THE DRAWINGS

The present invention will now be described with respect to several preferred embodiments of the method and apparatus aspects thereof, and with reference to the illustrative drawings appended hereto. It should be clearly understood, however, that the description of the embodiments, and the drawings, are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the collection of figures relating to one preferred embodiment, and denote like parts and gaps and spaces and so on in figures relating to different embodiments; and:

DESCRIPTION OF THE PREFERRED EMBODIMENTS

The present invention will now be described with reference to the preferred embodiments thereof, and with reference to the figures.

OVERALL TRANSMISSION STRUCTURE

Figure 1:
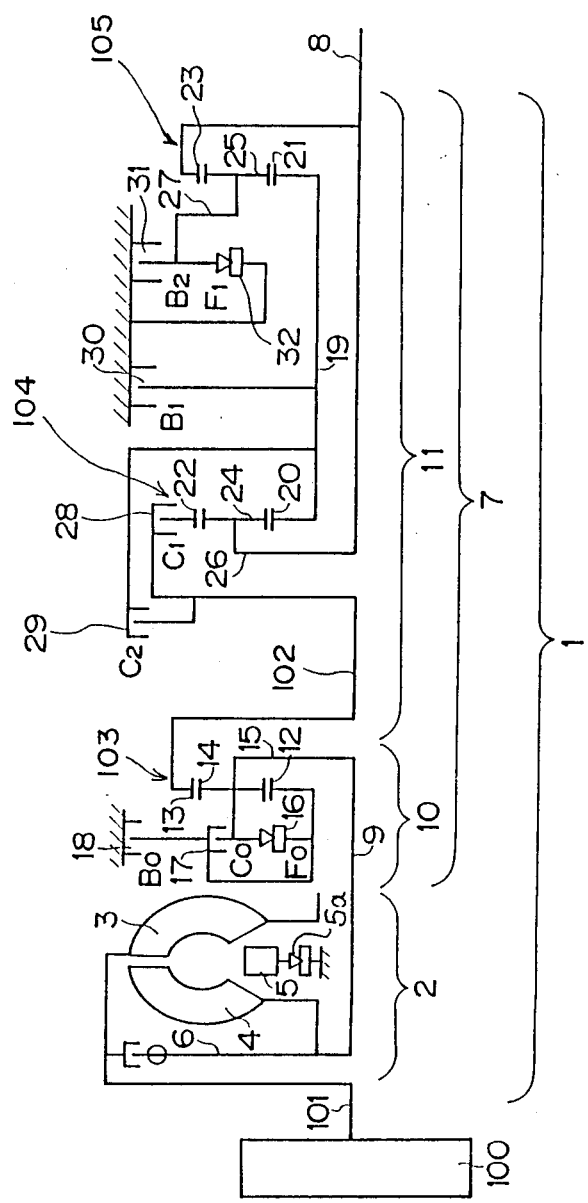
FIG. 1 is a schematic skeleton diagram showing the overall layout of the components of an automatic transmission to which all of the preferred embodiments of the idling control system and method of the present invention are applied.

FIG. 1 is a schematic skeleton diagram showing the overall layout of the components of an automatic transmission, denoted by the reference numeral 1, to which all of the preferred embodiments of the idling control system and method of the present invention can be applied. In this figure, the automatic transmission 1 is shown as being powered by an internal combustion engine 100 via a shaft 101 which may be a continuation of the crank shaft of said engine 100, and as transmitting output rotational power to a shaft 8 which leads, although this is not particularly indicated in the figures, to a differential device for powering the driven wheels of the automotive vehicle to which this automatic transmission 1 and this internal combustion engine 100 are fitted.

In more detail, the automatic transmission 1 comprises a fluid torque converter assembly 2 and a gear transmission mechanism 7. The fluid torque converter assembly 2 is supplied with rotational power via the aforementioned power output shaft 101 of the internal combustion engine 100, which thus functions as a power input shaft for said fluid torque converter assembly 2; and a shaft 9 functions as a power output shaft for said fluid torque converter assembly 2 and also as a power input shaft for the gear transmission mechanism 7 and transmits rotational power therebetween.

The fluid torque converter assembly 2 is of a per se conventional three element single stage type with a direct clutch, and comprises a pump impeller 3 rotationally connected to the power output shaft 101 of the internal combustion engine 1, a turbine member 4 rotationally connected to the power output shaft 9 for said torque converter assembly 2, and a stator member 5 mounted via a one way clutch 5a to the casing of said fluid torque converter assembly 2. In a per se known fashion, by circulation of transmission fluid in the general circulation pattern of a smoke ring around the toroidal shape defined by the pump impeller 3, the turbine member 4, and the stator member 5, torque is transmitted from the pump impeller 3 to the turbine member 4 and thereby from the power input shaft 101 of the fluid torque converter assembly 2 to the power output shaft 9 thereof with a certain amount of slippage and also of torque amplification being provided therebetween, the amount of such slippage and torque amplification being determined by the rotational speed of the power input shaft 101 of the torque converter assembly 2 and also by the output load on its power output shaft 9, as will be more particularly described hereinafter. A lock up clutch 6 of a per se known sort is provided for, when optionally engaged by the supply of actuating hydraulic pressure thereto from a control system therefor, directly connecting the power input shaft 101 to the power output shaft 9, thus bypassing the above described hydraulic connection for the torque converter assembly and eliminating said slippage and torque amplification provided thereby.

In further detail, the gear transmission mechanism 7 comprises an auxiliary gear transmission mechanism 10 and a main gear transmission mechanism 11. The auxiliary gear transmission mechanism 10 is supplied with rotational power via the aforementioned power output shaft 9 of the fluid torque converter assembly 2, which thus functions as a power input shaft for said auxiliary gear transmission mechanism 10; and a shaft 102 functions as a power output shaft for said auxiliary gear transmission mechanism 10 and also as a power input shaft for the main gear transmission mechanism 11 and transmits rotational power therebetween.

First, the auxiliary gear transmission mechanism 10 will be explained. This mechanism 10 comprises a first planetary gear mechanism 103 which comprises a sun gear 12, a coaxially provided ring gear 13, and a carrier 15 which rotatably supports a plurality of planetary pinions 14 which are meshed with outer teeth formed on the sun gear 12 and with inner teeth formed on the ring gear 13 and which perform planetary motion between said sun gear 12 and said ring gear 13 in a per se conventional manner. The carrier 15 of the planetary pinions 14 is rotationally connected to the power input shaft 9 of the auxiliary gear transmission mechanism 10 to receive rotational power therefrom, and the ring gear 13 is rotationally connected to the power output shaft 102 thereof so as to transmit rotational power thereto. A one way clutch F0 16 is provided for always rotationally connecting the carrier 15 to the sun gear 12 with respect to mutual rotation therebetween in one rotational direction only; a clutch C0 17 is provided for selectively, when operated by selective supply of actuating hydraulic fluid pressure thereto, rotationally connecting the carrier 15 to the sun gear 12 with respect to mutual rotational therebetween in both rotational directions; and a brake B0 18 is provided for selectively, when operated by selective supply of actuating hydraulic fluid pressure thereto, rotationally connecting the sun gear 12 to the casing of the auxiliary gear transmission mechanism 10 with regard to mutual rotation therebetween in both rotational directions. The clutch C0 and the brake B0 are both per se conventional types of friction engaging mechanisms comprising per se conventional hydraulic actuator systems, and are engaged when hydraulic fluid pressure is supplied to their pressure chambers (not particularly shown), while they are disengaged when no hydraulic fluid pressure is supplied to their said pressure chambers. Thus, by selective engagement and disengagement of the clutch C0 and the brake B0, the auxiliary gear transmission mechanism 10 can be controlled to provide either of two gearing ratios or rotational speed stages between its power input shaft 9 and its power output shaft 102, in a manner which will be clear to one of ordinary skill in the relevant art based upon the above explanations.

Next, the main gear transmission mechanism 11 will be explained. This mechanism 11 comprises second and third planetary gear mechanisms 104 and 105 which are arranged on the outside of a hollow intermediate shaft 19 which is coaxially fitted over the aforementioned power output shaft 8 of this main gear transmission mechanism 11. The second planetary gear mechanism 104 comprises a sun gear 20, a coaxially provided ring gear 22, and a carrier 26 which rotatably supports a plurality of planetary pinions 24 which are meshed with outer teeth formed on the sun gear 20 and with inner teeth formed on the ring gear 22 and which perform planetary motion between said sun gear 20 and said ring gear 22 in a per se conventional manner. The sun gear 20 is fixed upon the left end in the figure of the intermediate shaft 19, and the carrier 26 for the planetary pinions 24 is rotationally connected to the power output shaft 8 of this main gear transmission mechanism 11. A clutch C1 28 is provided for selectively, when operated as will be particularly described later by selective and appropriate supply of actuating hydraulic fluid pressure thereto, rotationally connecting said ring gear 22 to the power input shaft 102 of this main gear transmission mechanism 11 with respect to mutual rotation therebetween in both rotational directions. And a clutch C2 29 is provided for selectively, when operated by selective supply of actuating hydraulic fluid pressure thereto, rotationally connecting said power input shaft 102 of this main gear transmission mechanism 11 to the sun gear 20 and to the aforementioned intermediate shaft 19 with respect to mutual rotation therebetween in both rotational directions. The clutch C1, which as will be seen later functions as a forward clutch and is engaged when and only when the automatic transmission mechanism 1 as a whole is providing forward drive, is not particularly detailed with regard to its structure in FIG. 1, but can be of a per se conventional type as will be described later in detail; in any case, this clutch C1 is engaged when hydraulic fluid pressure is supplied to its actuating pressure chamber (not particularly shown in FIG. 1), while it is disengaged when no hydraulic fluid pressure is supplied to its said pressure chamber. Further, the clutch C2, which functions as a direct clutch, is a per se conventional type of friction engaging mechanism comprising a per se conventional hydraulic actuator system, and like the clutches C0 and C1 is engaged when hydraulic fluid pressure is supplied to its actuating pressure chamber (not particularly shown), while it is disengaged when no hydraulic fluid pressure is supplied to its said pressure chamber. The third planetary gear mechanism 105 comprises a sun gear 21, a coaxially provided ring gear 23, and a carrier 27 which rotatably supports a plurality of planetary pinions 25 which are meshed with outer teeth formed on the sun gear 21 and with inner teeth formed on the ring gear 23 and perform planetary motion between said sun gear 21 and said ring gear 23 in a per se conventional manner. The sun gear 21 is fixed on the right end in the figure of the aforementioned intermediate shaft 19, and the ring gear 23 is rotationally connected to the power output shaft 8 of this main gear transmission mechanism 11. A brake B1 30 is provided for selectively, when operated by selective supply of actuating hydraulic fluid pressure thereto, rotationally connecting the aforementioned intermediate shaft 19 to the casing of this main gear transmission mechanism 11 with respect to mutual rotation therebetween in both rotational directions. And a brake B2 31 is provided for selectively, when operated by selective supply of actuating hydraulic fluid pressure thereto, rotationally connecting the carrier 27 for the planetary pinions 25 to said casing of this main gear transmission mechanism 11 with respect to mutual rotation therebetween in both rotational directions. Also, a one way clutch F1 32 is provided for always rotationally connecting said carrier 27 for said planetary pinions 25 to said casing of this main gear transmission mechanism 11 with respect to mutual rotation therebetween in one rotational direction only. The brakes B1 and B2 again are per se conventional types of friction engaging mechanisms comprising per se conventional hydraulic actuator systems, and like the brake B0 are engaged when hydraulic fluid pressure is supplied to their pressure chambers (not particularly shown), while they are disengaged when no hydraulic fluid pressure is supplied to their said pressure chambers.

Thus, by selective engagement and disengagement of the clutches C1 and C2 and of the brakes B1 and B2, the main gear transmission mechanism 11 can be controlled to provide any one of three forward gearing ratios or rotational speed stages and one reverse gearing ratio or rotational speed stage between its power input shaft 102 and its power output shaft 8, in a manner which will be clear to one of ordinary skill in the relevant art based upon the above explanations. And, further, the gear transmission mechanism 7 as a whole, as a combination of the auxiliary gear transmission mechanism 10 and the main gear transmission mechanism 11 and by the combined operation thereof, according to selective engagement and disengagement of the clutches C0, C1, and C2 and of the brakes B0, B1 and B2, can be controlled to provide any one of five forward gearing ratios or rotational speed stages including an overdrive speed stage and one reverse gearing ratio or rotational speed stage between its power input shaft 9 and its power output shaft 8, as particularly detailed in the Table which for convenience of pagination is given at the end of the specification and before the claims of the present patent application. In this Table, an "O" in a column relating to a hydraulic clutch or a hydraulic brake indicates that said hydraulic clutch or hydraulic brake is engaged, while an "X" relating to such a hydraulic clutch or hydraulic brake indicates that said hydraulic clutch or hydraulic brake is disengaged; and an "O" in a column relating to a one way clutch indicates that said one way clutch is engaged so as to transmit rotational power when the internal combustion engine 100 is powering the driven wheels (not particularly shown) of the vehicle via the automatic transmission system 1 and on the other hand is free wheeling or disengaged when said engine 100 is not so driving said driven wheels of the vehicle, in other words indicates that said clutch is free wheeling in, and only in, the engine overrun condition; while an "F" relating to a one way clutch indicates that said one way clutch is free wheeling or disengaged. From this Table, it will be understood that: when the automatic transmission 1 is being operated in the drive or "D" range, all five of its forward speed stages including its overdrive speed stage are available to be utilized, according to vehicle operational conditions as will be explained later; but, however, when the automatic transmission 1 is being operated in the second or "S" range, no upshift from the third speed stage to the fourth or the fifth speed stage is ever performed, and only the first through the third speed stages are available to be utilized; and further, when the automatic transmission 1 is being operated in the low or "L" range, no upshift from the second speed stage to the third, the fourth, or the fifth speed stage is ever performed, and only the first and the second speed stages are available to be utilized. And further it will be particularly noted from this Table that the hydraulic clutch C1 is engaged when, and only when, the gear transmission mechanism 7 is engaged to a forward speed stage (i.e., to the first, second, third, fourth, or fifth speed stage), and is otherwise disengaged. And further from this Table it will be noted that the brake B1 is, during forward running of the vehicle, engaged when and only when the third speed stage of the gear transmission mechanism is being provided, in other words functions as a third speed brake.

In general, each of the various hydraulic clutches and brakes detailed above, i.e. the clutches C0, C1, and C2 and the brakes B0, B1, and B2, is selectively engaged and disengaged by its hydraulic actuator system, by selective supply of hydraulic fluid pressure thereto from a control system which is an embodiment of the present invention, according to the current values of various operational parameters of the vehicle to which this automatic transmission 1 is fitted, such as vehicle road speed, engine load, range set by the vehicle driver on a manual range setting valve, and so on. Further, when said manual range setting valve is set by the driver to a forward driving range such as "D" range, "S" range, or "L" range, and then the driver releases the accelerator pedal of the vehicle so as to reduce throttle opening to substantially zero, then as the vehicle road speed drops the aforesaid control system shifts the gear transmission mechanism 7 down through its speed stages, and below a certain road speed said gear transmission mechanism 7 is set to its first speed stage, in any one of the aforementioned forward driving ranges. The idling control method and system according to the present invention are partially characterized by operating so that, when the manual shift range of the transmission is set to a forward driving range, the vehicle is substantially stationary, and the engine thereof is substantially in the idling condition, the engagement pressure for the forward clutch C1 28 is reduced, so that said forward clutch C1 28 slips somewhat; thereby, anti creep action for the vehicle is provided.

THE FIRST PREFERRED EMBODIMENTS

Figure 2:
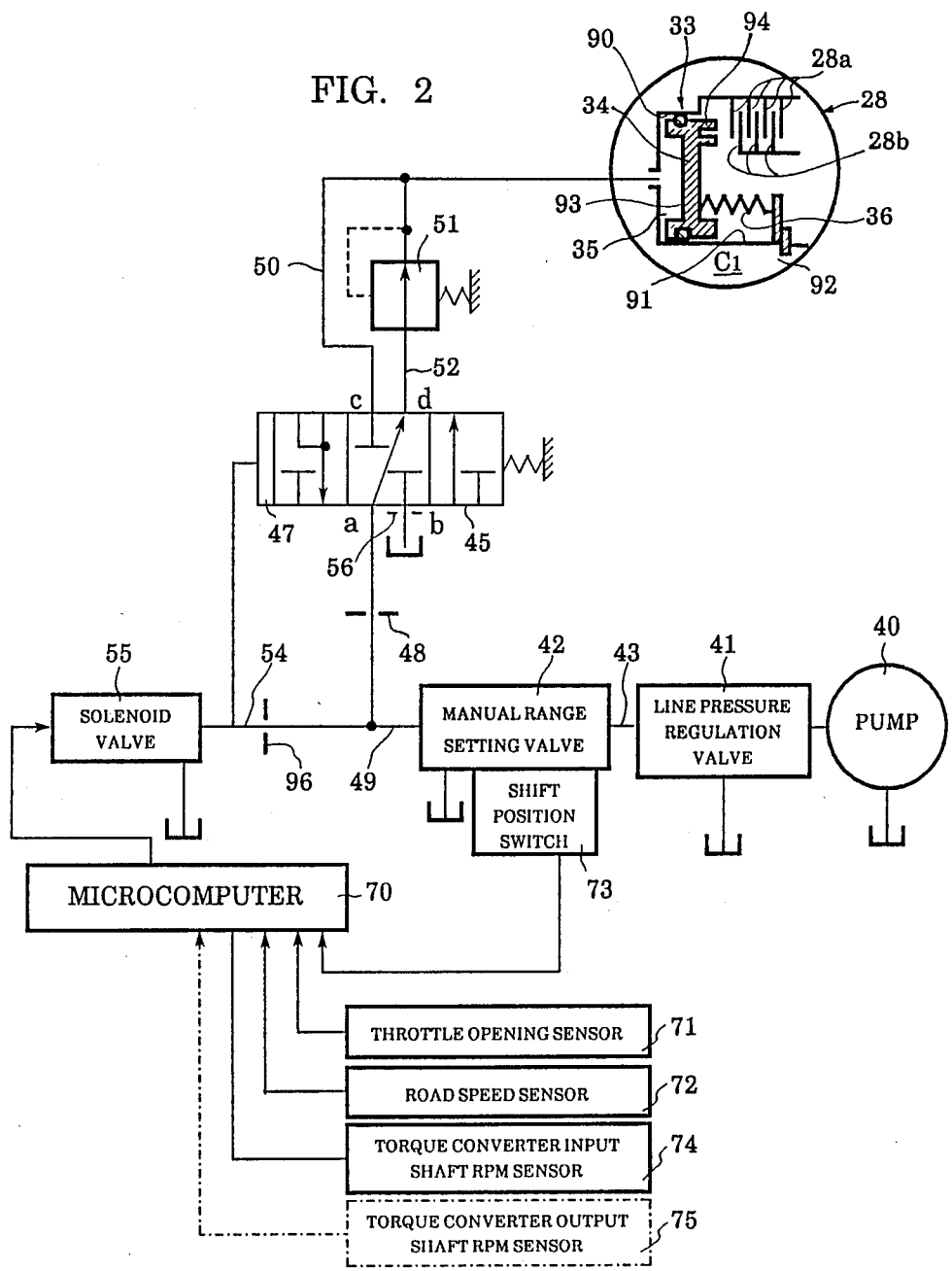
FIG. 2 is a schematic block diagram showing relevant parts of the first and alternatively the second preferred embodiments of the idling control system of the present invention, as applied to the FIG. 1 transmission, and also shows a partial longitudinal sectional view through a forward clutch of said FIG. 1 transmission.

The various embodiments of the anti creep method and system of the present invention are all of the hybrid hydraulic/electronic type incorporating a microprocessor, and in FIG. 2 a schematic block diagram of relevant parts of the first preferred embodiment of said control system is shown; this figure also shows a partial axial sectional view taken through a relevant version of the aforesaid forward clutch C1 28 of the gear transmission 7 of the transmission 1 to which this first preferred embodiment is provided.

In detail, the forward clutch C1 of the gear transmission mechanism 7 to which this first preferred embodiment is provided is per se conventional, having two sets 28a and 28b of annular clutch plates which are alternately superposed in a sandwiched arrangement, i.e. are mutually interleaved, and the outer peripheries of the one set 28a of these clutch plantes are rotationally secured to one of the shaft 102 and the ring gear 22 which this forward clutch 28 selectively rotationally couples together (see FIG. 1), while the inner peripheries of the other set 28b of these clutch plates are secured to the other one of said shaft 102 and said ring gear 22. The hydraulic actuator system 33 for this forward clutch C1 28 comprises an annular piston member 34 which can slide to and fro in the left and right directions as seen in FIG. 2 in an annular cylindrical bore which has an inner cylindrical bore 91 and an outer cylindrical bore 90 and which is defined in a member 92 rotationally coupled to (and typically integrally formed with) one of the shaft 102 and the ring gear 22. It should be understood that only a partial sectional view showing one side of the clutch plates 28a and 28b, the piston member 34, the bores 91 and 90, and so on, is shown in FIG. 2, and in fact the forward clutch C1 28 and its actuator system are generally annular and circularly symmetrical.

The annular piston member 34, in more detail, is generally formed as a flat annulus and extends between the inner cylindrical bore 91 and the outer cylindrical bore 90 and has an annular surface 93 defined on its left side in the figure, and the right hand (in the figure) annular end of a raised annulus 94 formed on its right side surface presses against the superposed sandwich of the sets of clutch plates 28a and 28b. Annular seal members are fitted between the outer periphery of the annular piston member 34 and the outer cylindrical bore 90, and between the inner periphery of said annular piston member 34 and the inner cylindrical bore 91, and thereby a pressure chamber 35 is defined on the left side in the figure of the piston member 34, with the effective pressure receiving area within this pressure chamber 35 of the piston member 34 being the aforementioned area of the annular surface 93. Further, an annular spring 36 is provided for biasing the annular piston member 34 in the leftwards direction in the figure, i.e. in the direction to release its pressing upon the superposed sandwich of the clutch plates 28a and 28b and to reduce the volume of the pressure chamber 35. Further, a conduit means 52 is provided for selectively supplying hydraulic fluid pressure to this pressure chamber 35, or alternatively for draining said chamber 35.

Accordingly, when no hydraulic fluid pressure is supplied to the pressure chamber 35 of this hydraulic actuator system 33, and this chamber 35 is instead drained, then by the biasing action of the annular spring 36 the piston member 34 is moved to the left in the figure, and thereby the superposed sandwich of the clutch plates 28a and 28b is not substantially compressed together at all, and the clutch plates 28a and the clutch plates 28b are not rotationally mutually substantially coupled together, and accordingly no substantial rotational torque can be transmitted from the shaft 102 to the ring gear 22 of the main gear transmission mechanism 11. Further, when hydraulic fluid pressure of a relatively low pressure level is supplied to the pressure chamber 35 of the hydraulic actuator system 33, then the action of this hydraulic fluid pressure urges the piston member 34 in the rightward direction in the figure with a relatively moderate force, against only the opposition of the annular biasing action of the spring 36 which is not very considerable in this context, and thereby the superposed sandwich of the clutch plates 28a and 28b is fairly moderately compressed together, and the clutch plates 28a and the clutch plates 28b are rotationally fairly moderately mutually coupled together, and accordingly rotational torque can be transmitted from the shaft 102 to the ring gear 22 of the main gear transmission mechanism 11 with a fairly moderate coupling action; in other words, only a relatively moderate torque can be satisfactorily transmitted. On the other hand, when hydraulic fluid pressure of a relatively high pressure level is supplied to said pressure chamber 35 of said hydraulic actuator system 33, then the action of this pressure urges the piston member 34 in the rightward direction in the figure with a relatively strong force, and thereby the superposed sandwich of the clutch plates 28a and 28b is relatively strongly compressed together, and the clutch plates 28a and the clutch plates 28b are rotationally relatively strongly mutually coupled together, and accordingly rotational torque can be transmitted from the shaft 102 to the ring gear 22 of the main gear transmission mechanism 11 with a relatively strong coupling action; in other words, a relatively large torque can be satisfactorily transmitted.

Now, the arrangements for supplying controlling hydraulic fluid pressure to the pressure chamber 34 of the hydraulic actuator system 33 for this clutch C1 28 will be detailed. A hydraulic fluid pump 40 picks up hydraulic fluid from a sump (not shown in detail) and supplies it under pressure via a conduit to a line pressure regulation valve 41, which selectively bleeds off some of said pressurized hydraulic fluid back to the sump so as to produce a line pressure at its output side which is regulated to a substantially constant value; so far, these elements described are per se conventional. This line pressure is supplied via a conduit 43 to the input port of a manual range setting valve 42, which also is per se conventional: this manual range setting valve 42 is of the type previously discussed, and comprises a valve element (not particularly shown ) which is manually settable by the driver of the vehicle, via a linkage or the like, to any one of the aforementioned various speed ranges, i.e. "D" or drive range, "S" or second range, "L" or low range, "R" or reverse range, "N" or neutral range, and "P" or parking range. This manual range setting valve 42 has various output ports, which are connected in various combinations to its said input port so as to receive supply of line pressure therefrom when the valve element of said manual range setting valve 42 is positioned to its various positions corresponding to these various ranges; most of these output ports are not relevant to the present discussion, but one of them, which is communicated to said input port of said manual range setting valve 42 when and only when the driver of the vehicle has selected a forward driving range thereon, i.e. has selected "D" or drive range, "S" or second range, or "L" or low range, is communicated via a conduit 49 and via a throttling element 48 located intermediately therein to a port designated as "a" of a forward clutch control valve 45.

The forward clutch control valve 45 has four ports, designated as "a", "b", "c", and "d". The port "a" is communicated to the manual range setting valve 42 as already described; thereby, when the manual range setting valve 42 is set to any one of "D" or drive range, "S" or second range, or "L" or low range, line pressure is supplied to said port "a" with a certain flow resistance interposed to said supply. The port "b" of the forward clutch control valve 45 is communicated to drain via a throttling element 56. The port "c" is communicated directly, via a hydraulic conduit 50, to the pressure chamber 35 of the hydraulic actuator system 33 for the forward clutch C1 28. And the port "d" of the forward clutch control valve 45 is communicated, via another hydraulic conduit 52 and a pressure reduction valve 51, likewise to said pressure chamber 35 of said hydraulic actuator system 33 for said forward clutch C1 28.

This forward clutch control valve 45 is a hydraulic switching valve which comprises a valve element (not particularly shown) which is urged to the right in the figure by supply of hydraulic fluid pressure to a pressure chamber 47, only schematically shown, provided at the left end in the figure of said forward clutch control valve 45, while said valve element is urged to the left in the figure by the biasing action of a spring, not particularly shown. And the forward clutch control valve 45 functions as follows. When the pressure chamber 47 is supplied with a hydraulic fluid pressure less than a first determinate pressure value, then as schematically indicated in the figure the aforementioned valve element of said forward clutch control valve 45 is positioned by the action of said spring to a first position in which its input port "a" is connected to its port "c", while its ports "b" and "d" are isolated and are connected to no other ports. When, on the other hand, said pressure chamber 47 is supplied with a hydraulic fluid pressure greater than said first determinate pressure value dand less than a second determinate pressure value, then also as schematically indicated in the figure the aforementioned valve element of said forward clutch control valve 45 is positioned by the action of said pressure fighting against said spring to a second position in which its input port "a" is connected to its port "d", while its ports "b" and "c" are isolated and are no connected to no other ports. And, when said pressure chamber 47 is supplied with a hydraulic fluid pressure greater than said second determinate pressure value, then also as schematically indicated in the figure the aforementioned valve element of said forward clutch control valve 45 is positioned by the action of said pressure which overcomes said spring to a third position in which its input port "a" is isolated and is not connected to any other ports, while its ports "c" and "d" are connected to its port "b".

Thus, assuming that the driver of the vehicle has positioned the manual range setting valve 42 to a forward driving range as explained above, so that supply of the line pressure is being provided from said valve 42 to the conduit 49 and thence to the port "a" of the forward clutch control valve 45: if the pressure chamber 47 of said forward clutch control valve 45 is being supplied with a hydraulic fluid pressure less than said first determinate pressure value, then the port "c" of said valve 45 is provided with line pressure while its ports "b" and "d" are isolated and are connected to no other ports, and accordingly substantially full line pressure is supplied to the pressure chamber 35 of the hydraulic actuator system 33 for the forward clutch C1 28, via the conduit 50, without substantially attenuation. Thereby said forward clutch 28 is fully engaged and is able to transmit maximum torque between the shaft 102 and the ring gear 22 of the main gear transmission mechanism 11, i.e. from the fluid torque converter assembly 2 to the output shaft 8 of the transmission, without substantial slippage. When, however, the pressure chamber 47 of said forward clutch control valve 45 is being supplied with a hydraulic fluid pressure greater than said first determinate pressure value but less than said second determinate pressure value, then the port "d" of said valve 45 is provided with line pressure while its ports "b" and "c" are isolated and are connected to no other ports, and accordingly line pressure is supplied to the pressure chamber 35 of the hydraulic actuator system 33 for the forward clutch C1 28, via the conduit 52, but receiving substantial attenuation from the pressure reduction valve 51. The preset setting of this pressure reduction valve 51 is so determined that the forward clutch C1 28 is, at this time, maintained in its condition as slipping just short of transmitting substantial torque between the shaft 102 and the ring gear 22 of the main gear transmission mechanism 11; in other words, so as to not quite allow the vehicle to creep substantially forward. And, when on the other hand the pressure chamber 47 of the forward clutch control valve 45 is being supplied with a hydraulic fluid pressure greater than said second determinate pressure value, then the ports "c" and "d" of said valve 45 are both drained via the port "b" thereof, and accordingly no substantial pressure at all is supplied to the pressure chamber 35 of the hydraulic actuator system 33 for the forward clutch C1 28, and therefore said forward clutch C1 28 is allowed to slip completely, and is substantially completely disengaged and does not transmit any substantial torque between the shaft 102 and the ring gear 22 of the main gear transmission mechanism 11.

The pressure chamber 47 of the forward clutch control valve 45 is supplied with actuating hydraulic fluid pressure from the manual range setting valve 42 via a conduit 54 branched from the conduit 49 and including a throttling element 96, and an intermediate portion of the conduit 54 downstream of the throttling element 96 is communicated with a port of an electromagnetic solenoid valve 55. This valve 55 is of a per se known type, and comprises a solenoid (not particularly shown) which is supplied with a pulsed electrical signal which has some duty ratio, from an electrical control system which will be described hereinafter. And, as mentioned earlier, the conduit 54 is also supplied via the throttling element 96 with line pressure from the manual range setting valve 42. The electromagnetic solenoid valve 55 is so constituted that: when said electromagnetic solenoid valve 55 is supplied with a pulse signal of a first determinate duty ratio value, it connects the conduit 54 to drain substantially always, so that the pressure supplied to the pressure chamber 47 of the forward clutch control valve 45 is very low or zero, and is certainly less than said first determinate pressure value; when said electromagnetic solenoid valve 55 is supplied with a pulse signal of a second determinate duty ratio value, it connects the conduit 54 to drain only intermittently, so that the pressure supplied to the pressure chamber 47 of the forward clutch control valve 45 is of an intermediate pressure value, greater than said first determinate pressure value but less than said second determinate pressure value; and, when said electromagnetic solenoid valve 55 is supplied with a pulse signal of a third determinate duty ratio value, it does not connect the conduit 54 to drain at all, so that the pressure supplied to the pressure chamber 47 of the forward clutch control valve 45 is substantially line pressure, i.e. is greater than said second determinate pressure value.

Accordingly, again assuming that the driver of the vehicle has positioned the manual range setting valve 42 to a forward driving range such as "D" range, "S" range, or "L" range as explained above, if the duty ratio of the pulse signal supplied to the electromagnetic solenoid valve 55 is equal to the aforementioned first determinate duty ratio value, then substantially full line pressure is supplied to the pressure chamber 35 of the hydraulic actuator system 33 for the forward clutch C1 28, via the conduit 50, without substantial attenuation, and thereby said forward clutch 28 is fully engaged and is able to transmit maximum torque between the shaft 102 and the ring gear 22 of the main gear transmission mechanism 11, i.e. from the fluid torque converter assembly 2 to the output shaft 8 of the transmission, without substantial slippage. When, however, the duty ratio of the pulse signal supplied to the electromagnetic solenoid valve 55 is equal to the aforementioned second determinate duty ratio value, then line pressure is supplied to the pressure chamber 35 of the hydraulic actuator system 33 for the forward clutch C1 28, via the conduit 52, but receiving substantial attenuation from the pressure reduction valve 51, and thereby as explained above the forward clutch C1 28 is, at this time, maintained in its condition as slipping just short of transmitting substantial torque between the shaft 102 and the ring gear 22 of the main gear transmission mechanism 11; in other words, so as to not quite allow the vehicle to creep substantially forward. And, when on the other hand the duty ratio of the pulse signal supplied to the electromagnetic solenoid valve 55 is equal to the aforementioned third determinate duty ratio value, accordingly no substantial pressure at all is supplied to the pressure chamber 35 of the hydraulic actuator system 33 for the forward clutch C1 28, and therefore said forward clutch C1 28 is allowed to slip completely, and is substantially completely disengaged and does not transmit any substantial torque between the shaft 102 and the ring gear 22 of the main gear transmission mechanism 11.

Figure 3:
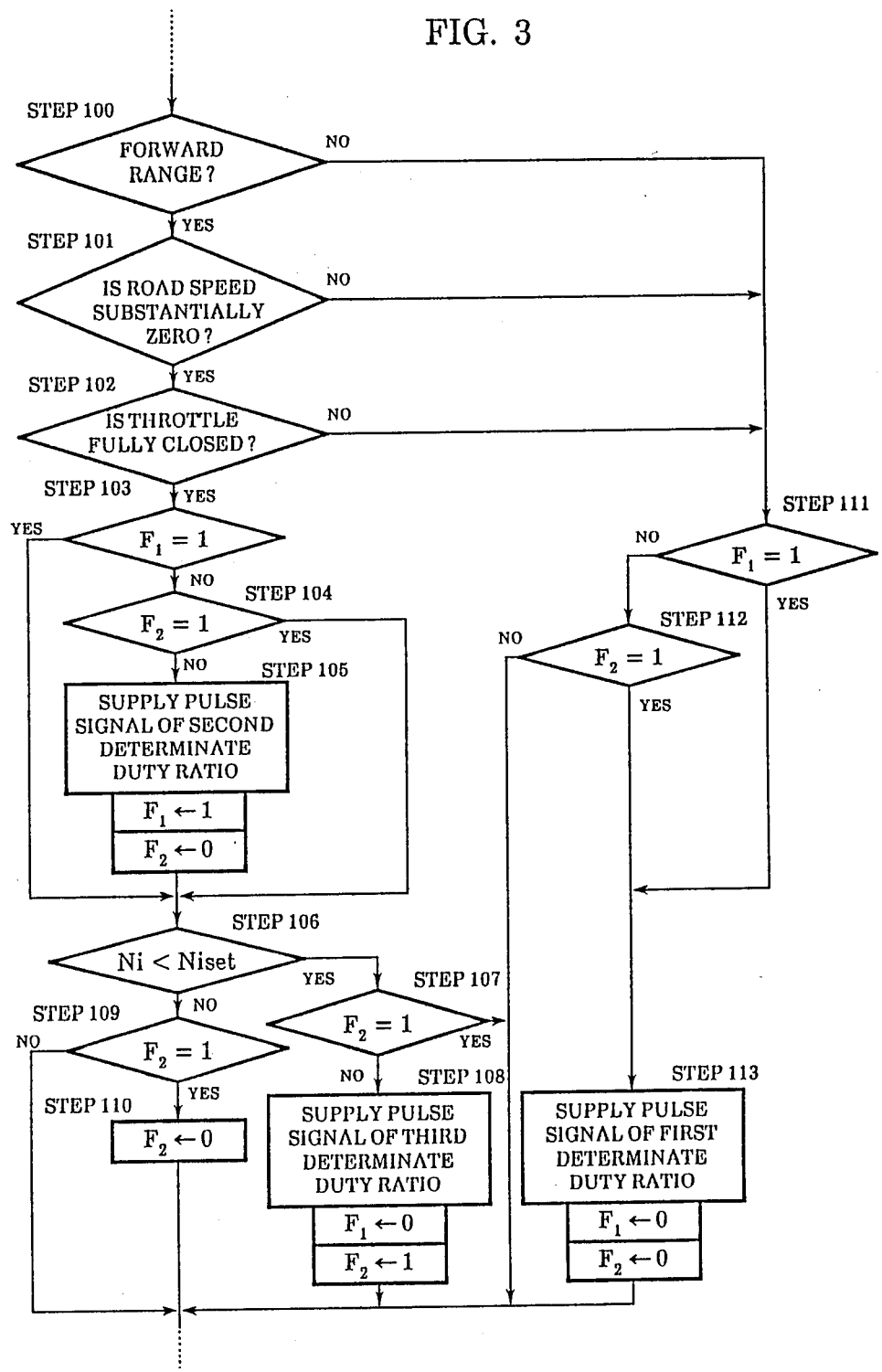
FIG. 3 is a flow chart for a portion of a program executed by a microprocessor incorporated in said first preferred embodiment of the idling control system of the present invention, said portion relating to anti creep idling control.

In overall control of the automatic transmission there is provided a control system which in this first preferred embodiment of the present invention (in fact also in the other later disclosed embodiments) incorporates a microcomputer 70, shown in FIG. 2 simply by a block; this block, and the term "microcomputer 70", in fact are intended to include not only the microprocessor which performs the computing processes which will be described shortly but also the various I/O interfaces such as D/A and A/D converters and so on associated with said microprocessor, as well as perhaps other functionally related means. This microcomputer 70 controls the engagement and disengagement of all of the hydraulic clutches and brakes detailed above, but only its role in engaging and disengaging the forward clutch C1 is relevant and will be discussed herein. The microcomputer 70 receives input signals from sensors, including: a throttle opening sensor 71, which senses the position of the throttle pedal (not particularly shown) of the internal combustion engine 100 of the vehicle and which produces an output signal representative thereof, which is taken as representative of engine load; a road speed sensor 72, which produces an output signal representative of vehicle road speed (actually of the rotational speed of the power output shaft 8 of the gear transmission mechanism); a shift position switch 73, which is provided as appended to the manual range selection valve 42, and which produces an output signal representative of what speed range is currently set on said manual range selection valve 42; and a torque converter input shaft rotational speed sensor 74, which senses the rotational speed of the input shaft 101 of the fluid torque converter assembly 2 and produces an output signal representative thereof. (The element 75, shown by double dashed lines, relates to the second preferred embodiment, and is described later). And the microcomputer 70 repeatedly executes a control program for setting the various clutches and brakes detailed above to be engaged or disengaged. The portion of said control program relating to the engagement and disengagement, by supply of an actuating electrical pulse signal to the electromagnetic solenoid valve 55, of the forward clutch C1 28, will now be detailed, with reference to FIG. 3 which is a flow chart of said relevant portion. This portion of the program is executed at regular intervals, or once every time the crankshaft of the engine 100 rotates through a determinate angle, and implements the anti creep idling control method of the present invention.

First, in the step 100, a test is made as to whether or not a forward driving range, i.e. "D" or drive range, "S" or second range, or "L" or low range, is selected on the manual range setting valve 42. The microcomputer 70 makes this decision based upon the output of the shift position switch 73. If the result of this test is NO, i.e. the range currently selected is not one in which forward vehicle motion is possible, then the flow of control passes next to the step 111; but, if the result of this test is YES, so that forward driving is possible, then the flow of control passes next to the step 101.

Next, in this step 101, a test is made as to whether the vehicle road speed is currently less than a predetermined small value, or not, i.e. as to whether the vehicle is currently substantially stopped, or not. The microcomputer 70 makes this decision based upon the output of the vehicle road speed sensor 72. If the result of this test is NO, i.e. the vehicle is not at this time substantially stationary, then as before the flow of control passes next to the step 111; but, if the result of this test is YES, so that the vehicle is currently stopped, then the flow of control passes next to the step 102.

Next, in this step 102, a test is made as to whether the throttle of the internal combustion engine 100 is currently fully closed, or not, i.e. as to whether the load on said internal combustion engine 100 is currently substantially zero, or not. The microcomputer 70 makes this decision based upon the output of the throttle opening sensor 71. If the result of this test is NO, i.e. the engine throttle is not at this time substantially fully closed, then as before the flow of control passes next to the step 111; but, if the result of this test is YES, so that the engine load is currently substantially zero, then the flow of control passes next to the step 103.

Next, in the step 103, a test is made as to whether the current value of a flag F1 is currently unity, or not. The flag F1, as will be seen later, is unity when and only when an electrical pulse signal of duty ratio equal to the second above defined determinate duty ratio value is being supplied to the electromagnetic solenoid valve 55, so that anti creep action is being provided with the forward clutch C1 28 being operated with a reduced torque transmission capability. If the result of this test is YES, i.e. the duty ratio of the pulsed electrical signal currently being supplied to the electromagnetic solenoid valve 55 is equal to the second above defined determinate duty ratio value and anti creep action is currently being performed, then the flow of control skips to pass next to the step 106; but, if the result of this test is NO, so that the duty ratio of the pulsed electrical signal currently being supplied to the electromagnetic solenoid valve 55 is not equal to the second above defined determinate duty ratio value and no anti creep is being currently provided, then the flow of control passes next to the step 104.

Next, in the step 104, a test is made as to whether the current value of a flag F2 is currently unity, or not. The flag F2, as also will be seen later, is unity when and only when an electrical pulse signal of duty ratio equal to the third above defined determinate duty ratio value is being supplied to the electromagnetic solenoid valve 55, so that the forward clutch C1 28 is currently substantially completely disengaged. If the result of this test is YES, i.e. the duty ratio of the pulsed electrical signal currently being supplied to the electromagnetic solenoid valve 55 is equal to the third above defined determinate duty ratio value and total disengagement of the forward clutch C1 28 is currently being performed, then the flow of control skips to pass next to the step 106; but, if the result of this test is NO, so that the duty ratio of the pulsed electrical signal currently being supplied to the electromagnetic solenoid valve 55 is not equal to the third above defined determinate duty ratio value (or the second one thereof either) and the forward clutch C1 28 is not currently fully disengaged, then the flow of control passes next to the step 105.

In this step 105, an electrical pulse signal is supplied to the electromagnetic solenoid valve 55 of duty ratio equal to the second above defined determinate duty ratio value, so that as explained above the forward clutch C1 28 is put into the condition of being operated with a reduced torque transmission capability, in other words so that anti creep action is performed. And then the flag F1 is set to unity, to indicate this condition, while the flag F2 is set to zero; and the flow of control passes next to the step 106. At this point the forward clutch C1 28 is held with a certain degree of slippage, just before the point of substantial torque transmission, and substantially no torque transmission thus is provided from the fluid torque converter assembly 2 to the front ring gear 22 (which is the input member to the gear transmission mechanism 7 for forward driving). Thereby, idling vibration is reduced, and creeping forward of the vehicle while stationary is effectively prevented.

Next, in the step 106, a test is made as to whether the current value Ni of the rotational speed of the input member of the torque converter assembly 2, i.e. of the output shaft 101 of the internal combustion engine 100 and of the pump impeller 3 of said torque converter assembly 2, is currently less than a determinate value Niset, or not. The value Niset is predetermined in view of the idling characteristics of the engine 100. When the rotational speed of the input member of the torque converter assembly 2 has fallen below Niset, then presumably this is due to the dragging of the forward clutch C1 28 causing the load to act on the fluid torque converter assembly 2, and then the flow of control skips to pass next to the step 107; but, if the result of this test is NO, so that the rotational speed of the input member of the torque converter assembly 2 currently is above Niset, then the flow of control passes next to the step 109.

In the step 107, a test is made as to whether the current value of the flag F2 is currently unity, or not. If the result of this test is YES, i.e. the duty ratio of the pulsed electrical signal currently being supplied to the electromagnetic solenoid valve 55 is already equal to the third above defined determinate duty ratio value and total disengagement of the forward clutch C1 28 is already currently being performed, then the flow of control skips to pass out of this anti creep routine, without doing anything further; but, if the result of this test is NO, so that the duty ratio of the pulsed electrical signal currently being supplied to the electromagnetic solenoid valve 55 is not yet equal to the third above defined determinate duty ratio value and the forward clutch C1 28 is not currently fully disengaged, then the flow of control passes next to the step 108. In this step 108, an electrical pulse signal is supplied to the electromagnetic solenoid valve 55 of duty ratio equal to the third above defined determinate duty ratio value, so that as explained above the forward clutch C1 28 is put into the condition of being substantially completely disengaged, in other words so that the rotational speed of the output shaft 101 of the engine 100 is allowed to rise. This avoids the problem which caused reduced engine rotational speed. And then the flag F1 is set to zero, while the flag F2 is set to unity, to indicate this condition; and the flow of control passes next out of this anti creep routine, without doing anything further. Thereby, again, idling vibration is reduced.

On the other hand, in the step 109, likewise a test is made as to whether the current value of the flag F2 is currently unity, or not. If the result of this test is NO, i.e. the duty ratio of the pulsed electrical signal currently being supplied to the electromagnetic solenoid valve 55 is not now equal to the third above defined determinate duty ratio value and total disengagement of the forward clutch C1 28 is not at this time currently being performed, then the flow of control skips to pass out of this anti creep routine, without doing anything further; but, if the result of this test is YES, so that the duty ratio of the pulsed electrical signal currently being supplied to the electromagnetic solenoid valve 55 is currently equal to the third above defined determinate duty ratio value and the forward clutch C1 28 is currently substantially fully disengaged, then the flow of control passes next to the step 110. In this step 110, the flag F2 is set to zero, and the flow of control passes next out of this anti creep routine, without doing anything further. Thereby, when repeating this anti creep program portion, when the anti creep conditions persist, in other words when the manual range setting valve 42 is still set to a forward driving range, when the vehicle road speed is substantially zero, and when the throttle is fully closed, then the step 105 will be executed, and again the electrical pulse signal supplied to the electromagnetic solenoid valve 55 will be of duty ratio equal to the second above defined determinate duty ratio value, so that as explained above the forward clutch C1 28 will be put into the condition of being operated with a reduced torque transmission capability, in other words so that anti creep action is performed. Thus, the forward clutch C1 28 will be held with a certain degree of slippage, just before the point of substantial torque transmission, and substantially no torque transmission thus will be provided from the fluid torque converter assembly 2 to the front ring gear 22.

On the other hand, in the step 111, to which as explained above the flow of control is transferred when it is ascertained, in any one of the decision steps 100 through 102, that the conditions for applying anti creep action do not currently hold, a test is made as to whether the current value of the flag F1 is currently unity, or not. If the result of this test is YES, i.e. the duty ratio of the pulsed electrical signal currently being supplied to the electromagnetic solenoid valve 55 is equal to the second above defined determinate duty ratio value and anti creep action is not currently to be performed, then the flow of control skips to pass next to the step 113; but, if the result of this test is NO, so that the duty ratio of the pulsed electrical signal currently being supplied to the electromagnetic solenoid valve 55 is not equal to the second above defined determinate duty ratio value, then the flow of control passes next to the step 112. In this next step 112, a test is made as to whether the current value of the flag F2 is currently unity, or not. If the result of this test is YES, i.e. the duty ratio of the pulsed electrical signal currently being supplied to the electromagnetic solenoid valve 55 is currently equal to the third above defined determinate duty ratio value and total disengagement of the forward clutch C1 28 is currently being performed, while on the other hand it is not desired to perform anti creep action at this time, then the flow of control similarly skips to pass next to the step 113; but, if the result of this test is NO, so that the duty ratio of the pulsed electrical signal currently being supplied to the electromagnetic solenoid valve 55 is not equal to the second or the third above defined determinate duty ratio value, and therefore must be currently equal to the first above defined duty ratio value, then the flow of control passes next to exit this routine without doing anything further. On the other hand, in the step 113, an electrical pulse signal is supplied to the electromagnetic solenoid valve 55 of duty ratio equal to the first above defined determinate duty ratio value, so that as explained above the forward clutch C1 28 is put into the condition of being substantially completely and firmly engaged, if of course the manual range selection valve 42 is currently set to a forward driving range. Thus, a normal first speed stage of the gear transmission mechanism 7 is made available. And then the flag F1 is set to zero, while the flag F2 is similarly set to zero, thereby to indicate this condition; and the flow of control passes next out of this anti creep routine, without doing anything further.

According to the above described idling control method and system according to this first preferred embodiment of the present invention, it is seen that the engine idling control is performed by monitoring a rotational speed associated with the fluid torque converter assembly (in the case of this first preferred embodiment, the rotational speed of the torque converter input member, i.e. of the shaft 101), so that it is ensured that no torque is transmitted through the forward clutch C1 28, while at the same time the forward clutch actuating pressure is held as high as possible consistent with such a condition. Thus, as compared with the previously outlined prior arts, the actuating pressure for the forward clutch C1 28 is kept relatively high—indeed, as high as practicable for any particular engine operational conditions—and thereby as fast a take up of clutch engagement as possible is made available. Accordingly, a good anti creep action is made available, and the automatic transmission is ensured of a good starting off feeling, while still no particularly hard brake application by the vehicle driver is required during the vehicle stationary engine idling condition, in order to prevent the vehicle moving off from rest when it is not desired for it to do so. Thus, this idling control system for an automatic transmission keeps engine fuel economy high, and helps to prevent engine overheating, as well as helping to prevent engine idling vibration. Further, because of the adaptive nature of this idling control system, variations in performance characteristics of the automatic transmission due to alterations in operational conditions are compensated for, as also are manufacturing variations. Accordingly, this idling control system has good producability in practice.

THE SECOND PREFERRED EMBODIMENTS

Figure 4:
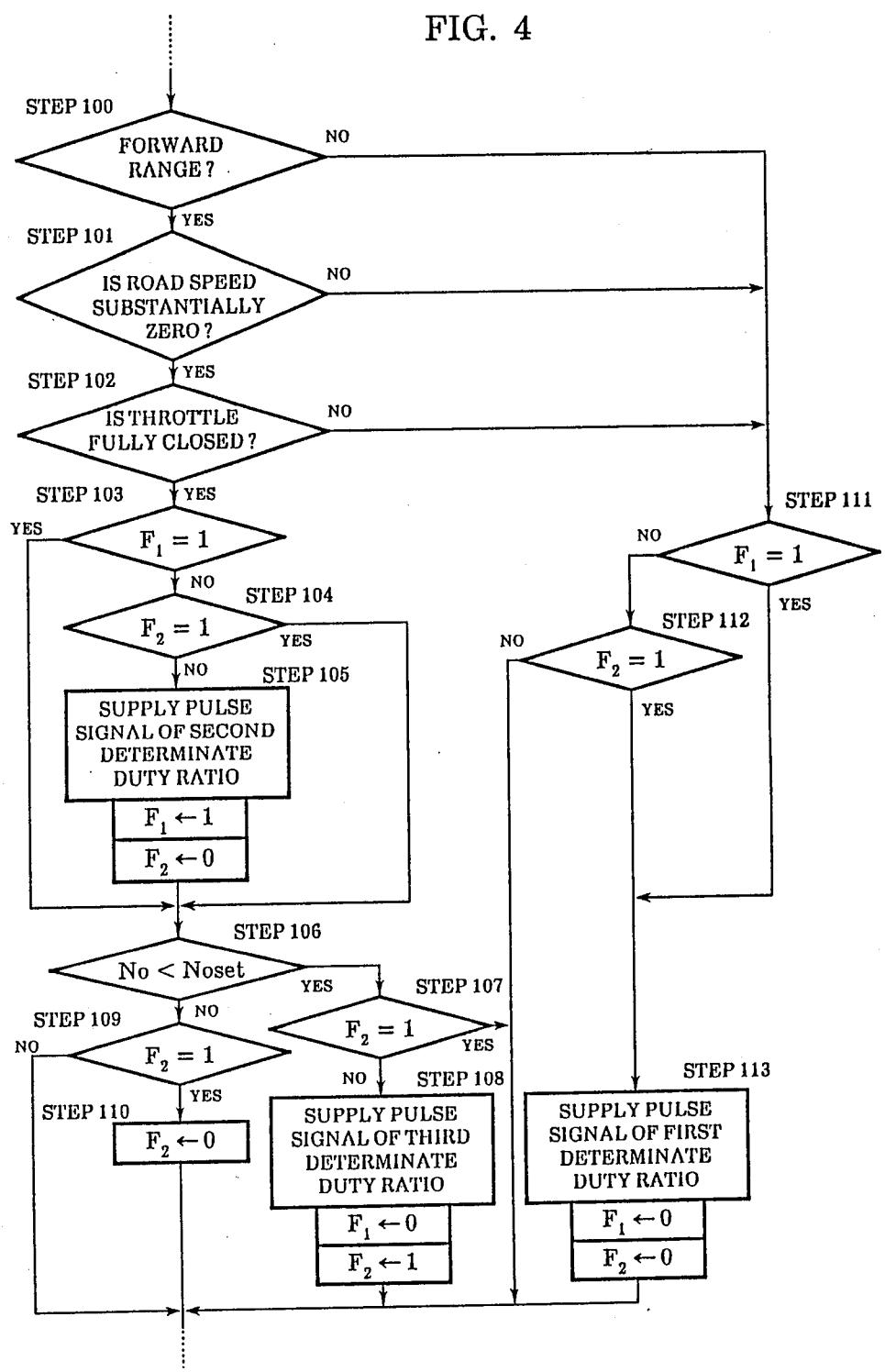
FIG. 4 is similar to FIG. 3 for the first preferred embodiment, being a flow chart for a similar portion of a program executed by a microprocessor incorporated in the second preferred embodiment of the idling control system of the present invention.

Now, the second preferred embodiments of the idling control system and method of the present invention will be described. In this connection, the gear train of the transmission which is controlled by this control system and method is the same one as described above with reference to FIG. 1, and the physical components of the idling control system are the same as in the first preferred embodiment described above and shown in FIG. 2, except for the fact that, as illustrated by the double dashed lines in that figure, the microcomputer 70 receives an input signal from a torque converter output shaft rotational speed sensor 75, which senses the rotational speed of the output shaft 9 of the fluid torque converter assembly 2 and produces an output signal representative thereof. Accordingly, in this second preferred embodiment, the previously provided torque converter input shaft rotational speed sensor 74, which senses the rotational speed of the input shaft 9 of the fluid torque converter assembly 2 and produces an output signal representative thereof, may be omitted. And the flow chart for the portion of the control program executed by this microcomputer 70 relating to the engagement and disengagement, by supply of an actuating electrical pulse signal to the electromagnetic solenoid valve 55, of the forward clutch C1 28, to implement the second preferred embodiment of the anti creep idling control method of the present invention, is detailed in FIG. 4 which is a flow chart of said relevant program portion. Again, this portion of the program is executed at regular intervals, or once every time the crankshaft of the engine 100 rotates through a determinate angle. The only difference between this FIG. 4 flow chart and the flow chart of FIG. 3 which relates to the first preferred embodiment is that in the step 106 the comparison performed is to check whether the current value No of the rotational speed of the output member of the torque converter assembly 2, i.e. of the shaft 9 and of the turbine member 4 of said torque converter assembly 2, is currently less than a determinate value Noset, or not. The value Noset, again, is predetermined in view of the idling characteristics of the engine 100. As before, when the rotational speed of the output member of the torque converter assembly 2 has fallen below Noset, then presumably this is due to the dragging of the forward clutch C1 28 causing the load to act on the fluid torque converter assembly 2, and then the flow of control skips to pass next to the step 107; but, if the result of this test is NO, so that the rotational speed of the output member of the torque converter assembly 2 currently is above Noset, then the flow of control passes next to the step 109. The same advantages and benefits are obtained with this operation, as were available with the first preferred embodiment described above; and hence detailed description thereof will be foregone. Parenthetically, the sensor 75 could alternatively detect the rotational speed of some element in the torque converter assembly 2 that rotated at the same speed as the turbine member 4, rather than the speed of the turbine member 4 itself.

THE THIRD PREFERRED EMBODIMENTS

There is an imperfection with the first and second preferred embodiments of the present invention as disclosed above. Namely, the threshold value for the rotational speed associated with the torque converter assembly is set as a constant value, and this is an imperfect arrangement. This is because the engine idling rotational speed varies with engine operational conditions such as warming up state, and also with the selective utilization engine ancillaries such as an air conditioner pump, an alternator, and the like. To allow for all these conditions with one value leaves too much latitude, and the result is that it is difficult to set the actuating pressure for the forward clutch at the maximum value possible which still prevents creep. Accordingly, as outlined earlier, there is a danger of the engine encountering snatch and suffering a shock during starting away from rest, due to delayed forward clutch engagement.

Figure 5:
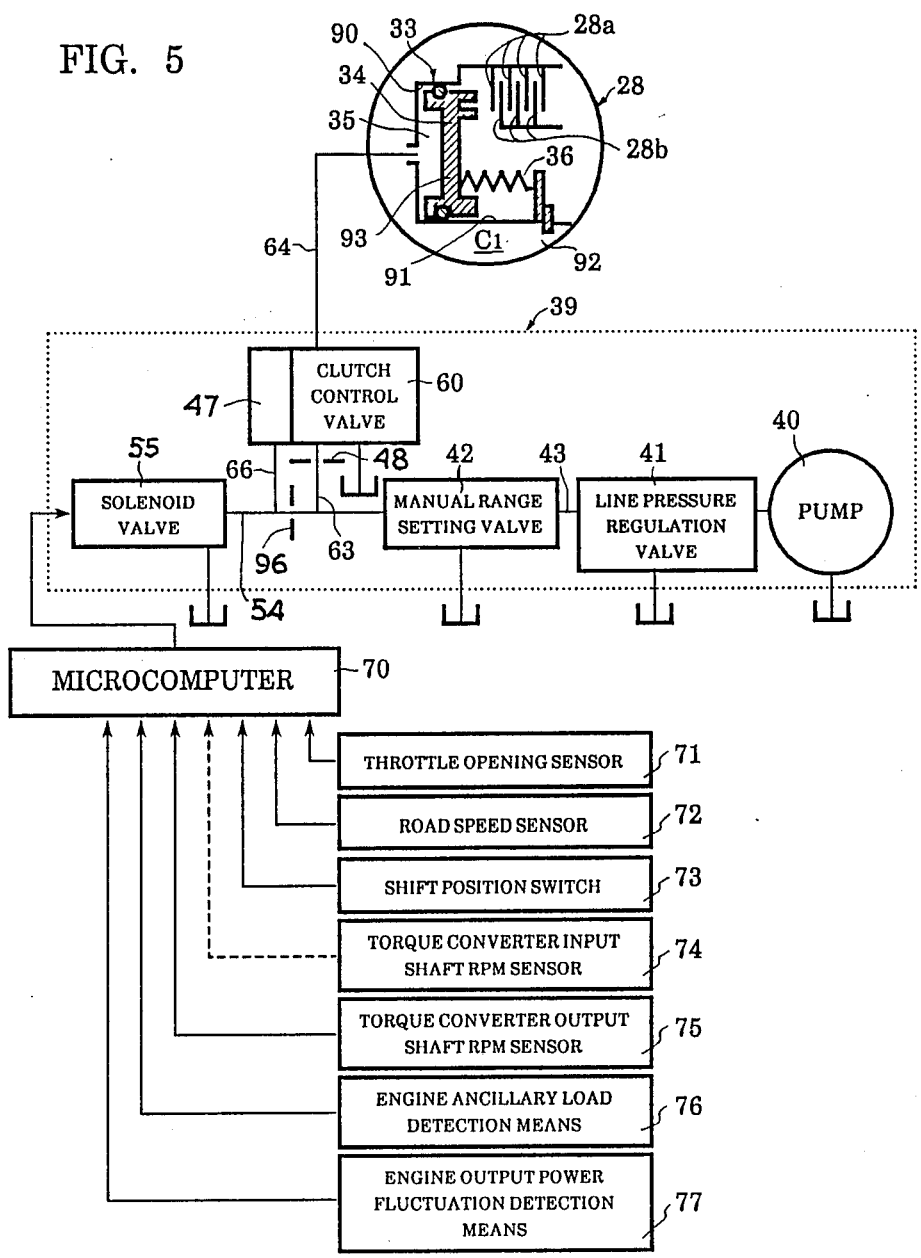
FIG. 5 is similar to FIG. 2 for the first and second preferred embodiments, being a schematic block diagram showing relevant parts of the third and alternatively the fourth preferred embodiments of the idling control system of the present invention, again as applied to the FIG. 1 transmission, and also showing a partial longitudinal sectional view through a forward clutch of said FIG. 1 transmission.

Now, the third preferred embodiments of the idling control system and method of the present invention will be described. In this connection, again, the gear train of the transmission which is controlled by this control system and method is the same one as described above with reference to FIG. 1. The physical components of the idling control system are similar to, but are not exactly the same as, those in the first and second preferred embodiments described above and shown in FIG. 2; they are shown in a fashion similar to FIG. 2 in FIG. 5. The differences are as follows.

First, the functions of the forward clutch control valve 45 and the pressure reduction valve 51 of the first and second preferred embodiments are in these third preferred embodiments subsumed under the function of a clutch control valve designated as 60; apart from this combination, the hydraulic link-ups are as before. This clutch control valve 60 includes a pressure chamber 47, which as in the previous cases is supplied with a variable pressure by the action of the electromagnetic solenoid valve 55 which is supplied with a pulsed electrical signal, and moderates the line pressure which it receives via the conduit 54 and the throttling element 96. And the clutch control valve 60 outputs a variable pressure from its output port which is connected to the conduit 64 which leads to the forward clutch C1 28, the magnitude of said variable pressure being determined by the magnitude of the control pressure thus fed to its said pressure chamber 47. Accordingly this function, as thus above stated, is a generalization of the combined functions of the forward clutch control valve 45 and the pressure reduction valve 51 utilized in the first and second preferred embodiments.

Second, the microcomputer 70, which as before supplies said pulse electrical signal with a particular duty ratio chosen according to operational conditions as will be explained shortly to the electromagnetic solenoid valve 55 thus to control the actuating pressure for the forward clutch C1 28, this time receives input signals from: a throttle opening sensor 71, which senses the position of the throttle pedal (not particularly shown) of the internal combustion engine 100 of the vehicle and which produces an output signal representative thereof, which is taken as representative of engine load; a road speed sensor 72, which produces an output signal representative of vehicle road speed (actually of the rotational speed of the power output shaft 8 of the gear transmission mechanism); a shift position switch 73, which is provided as appended to the manual range selection valve 42 (although this is not particularly shown), and which produces an output signal representative of what speed range is currently set on said manual range selection valve 42; a torque converter output shaft rotational speed sensor 75, which senses the rotational speed of the output shaft 9 of the fluid torque converter assembly 2 and produces an output signal representative thereof; (the element 74, shown connected by dashed lines to microcomputer 70, relates to the fourth preferred embodiment, and is described later) (so far these elements are as in the second preferred embodiment); an engine ancillary load detection means 76, which senses whether ancillary engine equipment such as an air conditioner pump and the like is operating, or not, and produces an output signal representative thereof; and an engine output power fluctuation detection means 77, which senses whether or not the output power of the internal combustion engine 100 is fluctuating, and which produces an output signal representative thereof. The flow chart for the portion of the control program executed by the microcomputer 70 relating to the engagement and disengagement, by supply of an actuating electrical pulse signal to the electromagnetic solenoid valve 55, of the forward clutch C1 28, in order to implement the third preferred embodiment of the anti creep idling control method of the present invention, is detailed in FIG. 7 which is a flow chart of said relevant program portion. Again, this portion of the program is executed at regular intervals, or once every time the crankshaft of the engine 100 rotates through a determinate angle. This program portion will be described in detail shortly; however, first, a general explanation of these third preferred embodiments of the anti creep idling control method and system of the present invention will be given with reference to FIG. 6 which is a general functional block diagram thereof.

Figure 6:
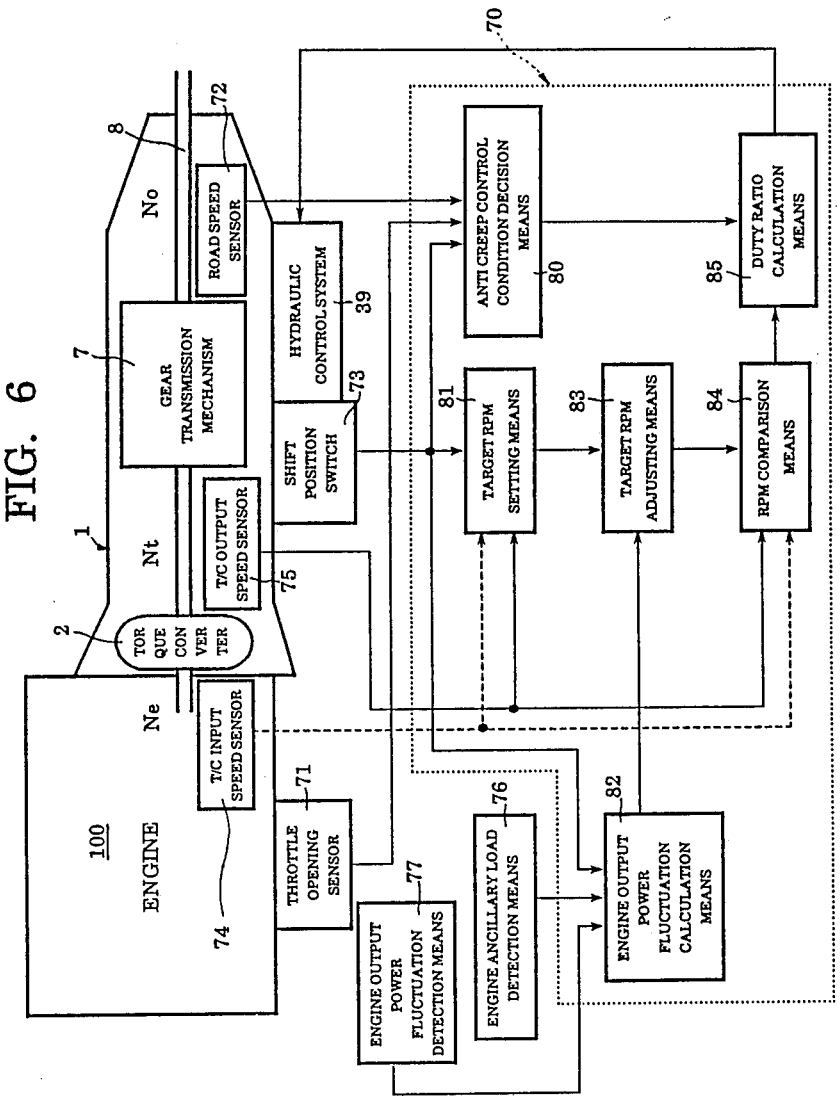
FIG. 6 is a general functional block diagram of the third preferred embodiment of the anti creep idling control method of the present invention.

Referring to FIG. 6, the anti creep control decision means 80 determines on the basis of the data contained in the output signals, which it receives, from the throttle opening sensor 71, the road speed sensor 72, and the shift position switch 73, whether or not anti creep action is currently to be provided. It outputs a control signal (a binary YES/NO signal for anti creep) to the duty ratio calculation means 85, to be described later.

Meanwhile, the target rotational speed setting means 81 determines on the basis of the data contained in the output signal, which it receives, from the torque converter output shaft rotational speed sensor 75, what is an appropriate target rotational speed for said torque converter output shaft 9, and supplies its output signal to the target rotational speed adjusting means 83, to be described shortly.

Further, the engine output power fluctuation calculation means 82 calculates on the basis of the data contained in the output signals, which it receives, from the shift position switch 73, the engine ancillary load detection means 76, and the engine output power fluctuation detection means 77, the fluctuations from the various ancillary engine equipment such as an air conditioner pump, an alternator, and the like, as well as the fluctuations from engine warmup, the range currently set on the manual range setting valve, and so on, and sends an output signal representative thereof to the target rotational speed adjusting means 83.

This target rotational speed adjusting means 83 adjusts the target rotational speed produced by the above described target rotational speed setting means 81 according to the output signal from the engine output power fluctuation calculation means 82, and then outputs its signal to the rotational speed comparision means 84.

This rotational speed comparison means 84 compares the actual current value of the rotational speed for the torque converter output shaft 9, which it determines on the basis of the data contained in the output signal, which it receives, from the torque converter output shaft rotational speed sensor 75, with the adjusted target rotational speed for said torque converter output shaft 9 which it receives from the just described, and dispatches an output signal to the duty ratio calculation means 85.

This duty ratio calculation means 85 receives this output signal from the rotational speed comparison means 84 and, when anti creep conditions hold as signified by the output signal from the anti creep control decision means 80 which it receives, optimizes the duty ratio of the pulsed electrical signal to be supplied to the electromagnetic solenoid valve 55 according to the stabilized method of feedback control, based upon the target rotational speed for the torque converter output shaft 9, the actual current rotational speed thereof, and the current rate of change thereof, and then outputs such a pulsed electrical signal of the appropriate duty ratio to the electromagnetic solenoid valve 55.

Figure 7:
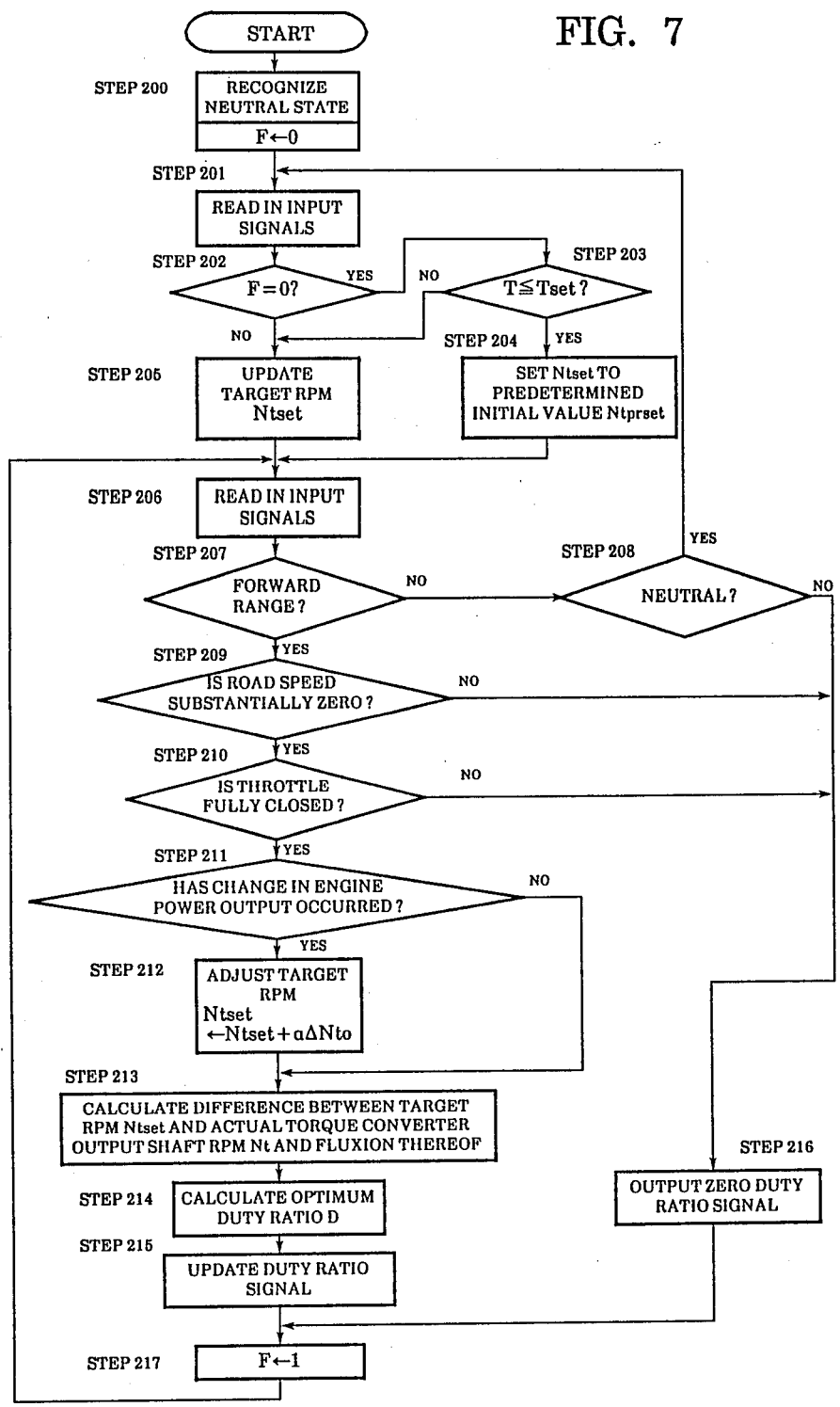
FIG. 7 is similar to FIGS. 3 and 4 for the first and second preferred embodiments, being a flow chart for a portion of a program executed by a microprocessor incorporated in said third preferred embodiment of the idling control system of the present invention, said portion again relating to anti creep idling control.

The flow chart of FIG. 7 for the portion of the control program executed by the microcomputer 70 which implements this general block diagrammed process for anti creep control described above with relation to FIG. 6 will now be detailed. The repetitive obeying of this routine is started once the ignition of the vehicle is turned on.

First, in the step 200, a check is made as to whether "N" or neutral range is selected on the manual range setting valve 42. The microcomputer 70 makes this test based upon the output of the shift position switch 73. The value of a flag F is set to zero, and then the flow of control passes next to the step 201. As will be seen later, the fact that the flag F is zero means that since the ignition was last switched on the transmission has not even once been put into a driving range, i.e. into a range other than the "N" or neutral range.

Next, in this step 201, the values of the various input signals from the sensors and switches are read in and are processed by A/D converters or the like, not particularly shown. Then the flow of control passes next to the step 202.

In this decision step 202, a test is made as to whether the value of the flag F is currently zero, or not. Since immediately after the ignition switch is turned on the value of the flag F will be zero and the result of this test will be YES, then in such a case the flow of control passes to the step 203; and this will happen every time around the FIG. 7 flow chart, as long as the transmission is left set to the "N" or neutral range. On the other hand, if the transmission has, even once since the last time of switching on the ignition switch, been set to a driving range other than the "N" or neutral range, then the result of this test will be NO, and then the flow of control passes next to the step 205.

In this decision step 203, a test is made as to whether the length of time T that has passed since recognizing the "N" or neutral range (in the step 200) is less than a determinate value Tset, or not. If the answer is YES, then the flow of control is passed next to the step 204.

In this step 204 no updating of the target rotational speed value Ntset is performed, because of engine starting up revolution speed instability, but instead a predetermined value Ntprset is assigned to Ntset; this value Ntprset is appropriately set so that, regardless of any operational fluctuations of the engine 100, no creep occurs. And then control passes to the step 206.

On the other hand, in the step 205, the target rotational speed value Ntset, which was primarily set to be the predetermined initial value Ntprset in the step 204, is updated based upon the rotational speed of the torque converter output shaft 9 when in the "N" or neutral speed range. This updating can be done by setting Ntset to Nt-$\beta\delta$Nt. And then again control passes to the step 206.

Next, in this step 206, again the values of the various input signals from the sensors and switches are read in and are processed by A/D converters or the like, not particularly shown. Then the flow of control passes next to the step 207.

In this step 207, a test is made as to whether or not a forward driving range, i.e. "D" or drive range, "S" or second range, or "L" or low range, is selected on the manual range setting valve 42. The microcomputer 70 makes this decision based upon the output of the shift position switch 73. If the result of this test is NO, i.e. the range currently selected is not one in which forward vehicle motion is possible (that is, is "P" or parking range, "N" or neutral range, or "R" or reverse range), then the flow of control passes next to the step 208; but, if the result of this test is YES, so that forward driving is currently possible, then the flow of control passes next to the step 209.

In the step 208, again a check is made as to whether "N" or neutral range is selected on the manual range setting valve 42. If the result is YES, then the flow of control passes back to the step 201 again; otherwise, the flow of control passes to the step 216.

On the other hand, in the step 209, a test is made as to whether the vehicle road speed is currently less than a predetermined small value, or not, i.e. as to whether the vehicle is currently substantially stopped, or not. The microcomputer 70 makes this decision based upon the output of the vehicle road speed sensor 72. If the result of this test is NO, i.e. the vehicle is not at this time substantially stationary, then as before the flow of control passes next to the step 216; but, if the result of this test is YES, so that the vehicle is currently substantially stopped, then the flow of control passes next to the step 210.

In this step 210, a test is made as to whether the throttle of the internal combustion engine 200 is currently fully closed, or not, i.e. as to whether the load on said engine 200 is currently substantially zero, or not. The microcomputer 70 makes this decision based upon the output of the throttle opening sensor 71. If the result of this test is NO, i.e. the engine throttle is not at this time substantially fully closed, then as before the flow of control passes next to the step 216; but, if the result of this test is YES, so that the engine load is currently substantially zero, then the flow of control passes next to the step 211. At this point in the flow chart it is determined that all the conditions for providing anti creep function are present.

In the step 211, a test is made as to whether a change in engine output power has occurred, or not. Such a change in engine output power can be one caused by the operation of an air conditioner pump, of an alternator or other engine ancillaries, or by a change in the running conditions of the engine itself, for example a power output change associated with engine warming up control parameterized by coolant temperature, or due to shifting of the manual range setting valve 42 from neutral range to drive range. In any case, if the result of this test is NO, i.e. the engine output power has not at this time substantially occurred, then the flow of control passes next to the step 213; but, if on the other hand the result of this test is YES, then the flow of control passes next to the step 212.

In this step 212, using a correction coefficient $\alpha$ according to the change in engine output, and a correction step unit $\delta$Nto (since this preferred embodiment utilizes the rotational speed of the torque converter output shaft 9), then Ntset is increased by $\alpha\delta$Nto. This correction coefficient $\alpha$ will be positive when the engine output increases, and will be negative when the engine output decreases. Next, the flow of control passes to the step 213.

In the step 213, the difference $\delta$Ntset, Nt between the targe rotational speed Ntset for the torque converter output shaft 9 and the actual value Nt thereof is calculated, and also the rate of change Nt thereof is calculated. Next, the flow of control passes to the step 214.

In this step 214, using $\delta Nt$ and $Nt$ as obtained in the step 213, by an optimum calculation method worked out in advance by stability analysis of automatic control theory of feedback control systems, the optimum duty ratio D for the pulse signal to be supplied to the electromagnetic solenoid valve 55 is calculated. For example, this may be done according to the equation $D:=D+k1\times\delta Nt+k2\times Nt$, where k1 and k2 are coefficients to be optimized theoretically and experimentally for control stability and response, because control input, i.e., a difference in the value D in the present case, for cancelling and deviation occuring in the rotational speed of the torque converter output shaft 9 as compared with a target value therefor is desired to be primarily proportional to said deviation and secondarily to the rate of change of said rotational speed, as well known in the art. Then the flow of control passes to the step 215.

In this step 215, an electrical pulse signal is supplied to the electromagnetic solenoid valve 55 of updated duty ratio equal to the above defined newly determined optimum duty ratio value D, so that as explained above the forward clutch C1 28 is put into the condition of being operated with an appropriate torque transmission capability, in other words so that anti creep action is performed. And then the flow of control passes to the step 217, in which the flag F is set to unity, to indicate that a driving range has been selected (at least once) on the manual range setting valve 42; and then the flow of control returns to the step 206 to cycle round again.

On the other hand, in the step 216, to which as explained above control is passed if anti creep control is not required to be performed for any one of several reasons as seen from the decision steps 207 through 210, an electrical pulse signal is supplied to the electromagnetic solenoid valve 55 of zero duty ratio, so that the forward clutch C1 28 is put into the condition of being fully engaged, and thus normal transmission operational mode is ensured, in other words no anti creep action is performed. And then, again, the flow of control passes to the step 217, and the flag F is set to unity and then returns to the step 206 to cycle round again.

Now, with reference to FIG. 8 which is a chart showing the fluid torque converter output characteristics, i.e. the combined characteristics of the engine and the fluid torque converter assembly 2, an explanation will be given of how the control target rotational speed for the torque converter output shaft 9 is determined. In this diagram, torque converter output rotational speed Nt (in rpm) is shown along the horizontal axis and torque converter output shaft torque Tt (in kg-m) is shown along the vertical axis, and further e is the speed ratio (Nt/Ne), while $\Theta$ is the throttle opening. And Ntn1 through Ntn4 are fluid torque converter output shaft 9 rotational speeds in neutral, with the larger suffixed ones thereof corresponding to larger engine output torques.

For example, let Ntn1 be the fluid torque converter output shaft 9 rotational speed in neutral in normal running conditions after engine warming up is completed. Thus, considering a spectrum of the same speeds during engine warming up, the lower is the coolant temperature, the higher is the suffix number for Ntn2 through Ntn4, and the fluid torque converter output shaft 9 rotational speed becomes larger. When the engine is under substantially no load, there is almost no slippage between the input and the output members of the fluid torque converter assembly 2, and so $e\approx 1$. So, in neutral, we can say Nt is equal to Ne, i.e. $Ntn1\approx Nen1 \ldots Ntn4\approx Nen4$.

When the vehicle is stationary (i.e., the rotational speed No of the output member of the transmission is zero), then when the manual range setting valve 42 is shifted by the driver from the neutral range to the drive range, the forward clutch C1 28 starts to engage, and, according to the torque amount of said forward clutch C1 28 determined by the engaging force (i.e. the pressure to the pressure chamber 35 of the actuator 33 thereof) the fluid torque converter output shaft 9 rotational speed Nt changes along each line (in the FIG. 8 graph), so that the rotational speed drops, and eventually Nt becomes zero.

Figure 8:
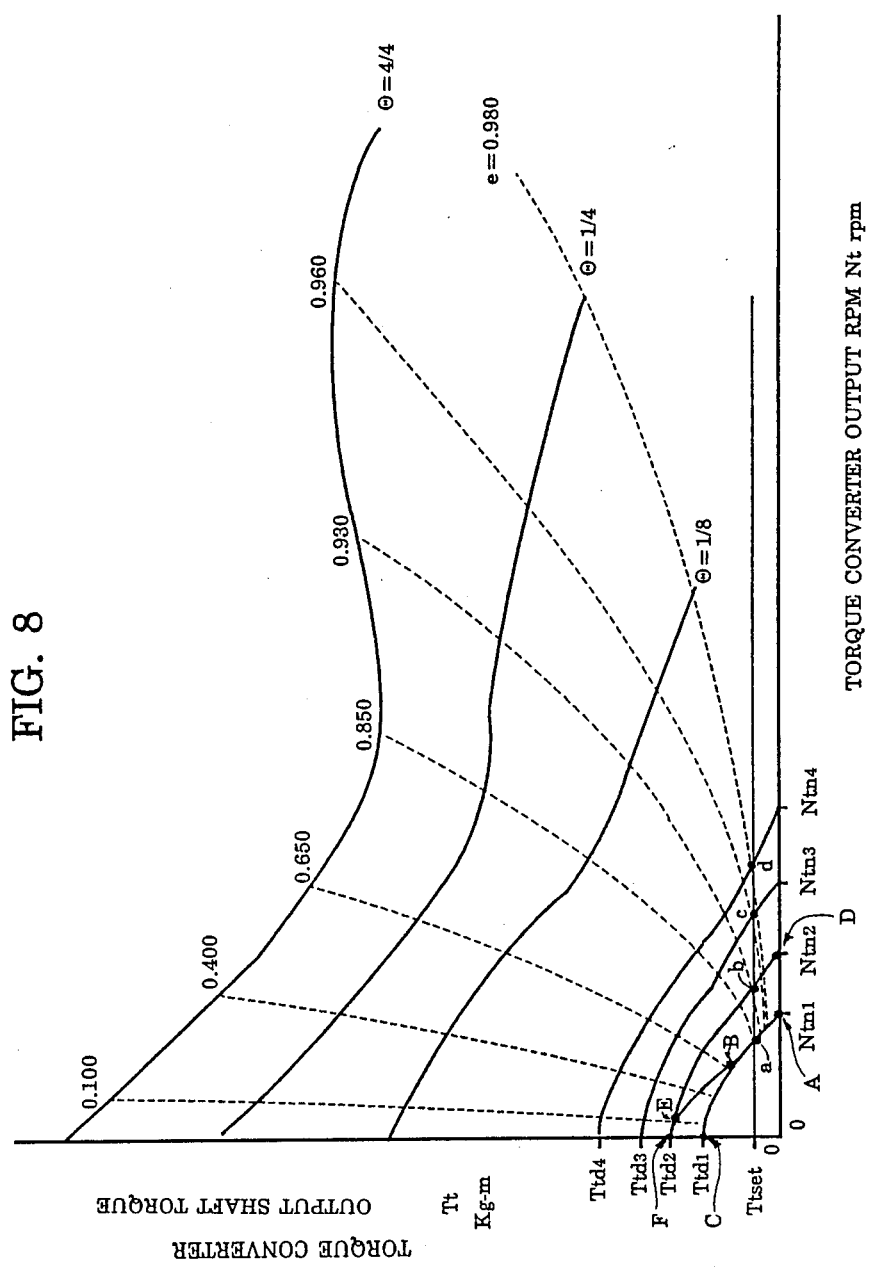
FIG. 8 is a chart showing fluid torque converter output characteristics, in which torque converter output rotational speed in rpm is shown along the horizontal axis and torque converter output shaft torque in kg-m is shown along the vertical axis.

For example, when in neutral Nt=Ntn1, then the point representing the fluid torque converter output member 9 rotational speed Nt against the output shaft torque Tt in FIG. 8 moves along the line A-B-C; while, when in neutral Nt=Ntn2, then said point in FIG. 8 moves along the line D-E-F. Thus, when the manual range setting valve 42 is shifted by the driver from the neutral range to the drive range, the EFI control changes to cause said point to move along the line A-B-E-F.

When the line pressure is being supplied to the pressure chamber 35 of the actuator 33 of the forward clutch C1 28 so as fully to engage said forward clutch, then the output torque of the fluid torque converter assembly 2 when the accelerator pedal is not being substantially depressed is shown by Ttd1 to Ttd4; as the suffix (1 through 4) increases, the engine output torque increases. That is, as Tt goes from Ttd1 to Ttd4, while the vehicle is in the "D" or drive range and is stationary, the creep torque increases.

The driving force that is required to move the vehicle off from rest is determined by various vehicle characteristics such as weight, losses in the transmission system and the engine, and by the current road conditions like the gradient and the slipperiness. We find the maximum tolerated drive force not to start in motion on a level dry asphalt road, and then get the target Tt value Ttset by considering the efficiency and the speed change ratio of the tranmission during final deceleration (i.e. during stopping of the vehicle).

For example, when the engine is in the fully warmed up state, no ancillary load is being imposed on the engine, and the operational conditions are normal, and when in the neutral range the fluid torque converter output rotational speed Nt is Ntn1 (the point A), then the point giving the above output torque Tset is the point a. If the fluid torque converter output rotational speed Nt at a is Nta, then Nta is the target rotational speed Ntset to be found; during anti creep control, we control the actuator 33 for the forward clutch C1 28 so that the actual fluid torque converter output rotational speed Nt does not drop below the target Ntset, i.e. Nta. Similarly, when the fluid torque converter output rotational speed Nt in the neutral range is any one of Ntn2 through Ntn4, the target Ntset is the rotational speed at the points b through d; these are Ntb through Ntd.

The differences between Nta through Ntd and Ntn1 through Ntn4 are almost the same, so that the target can be $Ntn-\beta\delta Nt$.

Also, the target rotational speed can be set so that the speed ratio e is a certain value. In the neutral range, the fluid torque converter output rotational speed Nt and its input rotational speed Ne are almost the same, so that when in neutral Ne≈Nen1=Ntn1, and the target value Ne becomes Neset=Nta/ea.

Thus, setting the target rotational speed means that under the conditions for the vehicle not to move the drive force is controlled not to go over the set value Tset. If a road gradient sensor is provided, then the target value Ttset for the drive force can of course be varied.

Next, a discussion will be made of the control target rotational speed value for engine output fluctuation. For example, the effect of a correction device changes the line A-B-C for shifting into A-B-E-F, so in neutral similarly the output increase changes Ntn1 into Ntn2, and we increase the control target Ntset by Ntb−Nta. As a practical calculation, we do as in step 212 of the flow chart of FIG. 7. The correction amount applied is Ntb−Nta=α.δNt0 for the fluid torque converter output rotational speed Nt represented by a coefficient alpha stored in a data map in the microcomputer memory for various engine output fluctuation conditions.

The aim of the anti creep control is not only to stop the vehicle moving off from rest undesirably, but to reduce idling vibration. So, in the FIG. 8 Nt-Tt line diagrams, the tolerance limit for idling vibration due to torque fluctuation is determined by practical evaluation, and within this range we set the control target value on the low side as far as possible, so we can get fast recovery in the normal stationary driving range.

THE FOURTH PREFERRED EMBODIMENTS

The control factor which is the rotational speed of an element of the fluid torque converter is not limited to being the rotational speed of the output member thereof, but may be the rotational speed of the input member thereof, just in the same way as the second preferred embodiments of the present invention differed from the first ones. Thus, in fourth preferred embodiments of the method and system of the present invention, there may be provided a torque converter input shaft rotational speed sensor 74, which senses the rotational speed of the input shaft 9 of the fluid torque converter assembly 2 and produces an output signal representative thereof, instead of the torque converter output shaft rotational speed sensor 75 of the third preferred embodiments; this variation is shown by the dashed line in FIG. 5. The necessary modifications to the flow chart of FIG. 7 are simply made, and further description of these fourth preferred embodiments will be eschewed in the interests of brevity of description.

THE FIFTH PREFERRED EMBODIMENTS

With the third and the fourth preferred embodiments of the present invention as disclosed above, the threshold value Ntset for the rotational speed associated with the torque converter assembly was reset whenever the transmission is shifted to the neutral range, and this arrangement. However, since the transmission is in fact not so very often shifted to the neutral range, this might still be considered as leaving rather a great latitude, with regard to the desirability of always setting the actuating pressure for the forward clutch at the maximum value possible which still prevents creep. Accordingly, there might still remain a danger of the engine encountering snatch and suffering a shock during starting away from rest, due to delayed forward clutch engagement.

Figure 9:
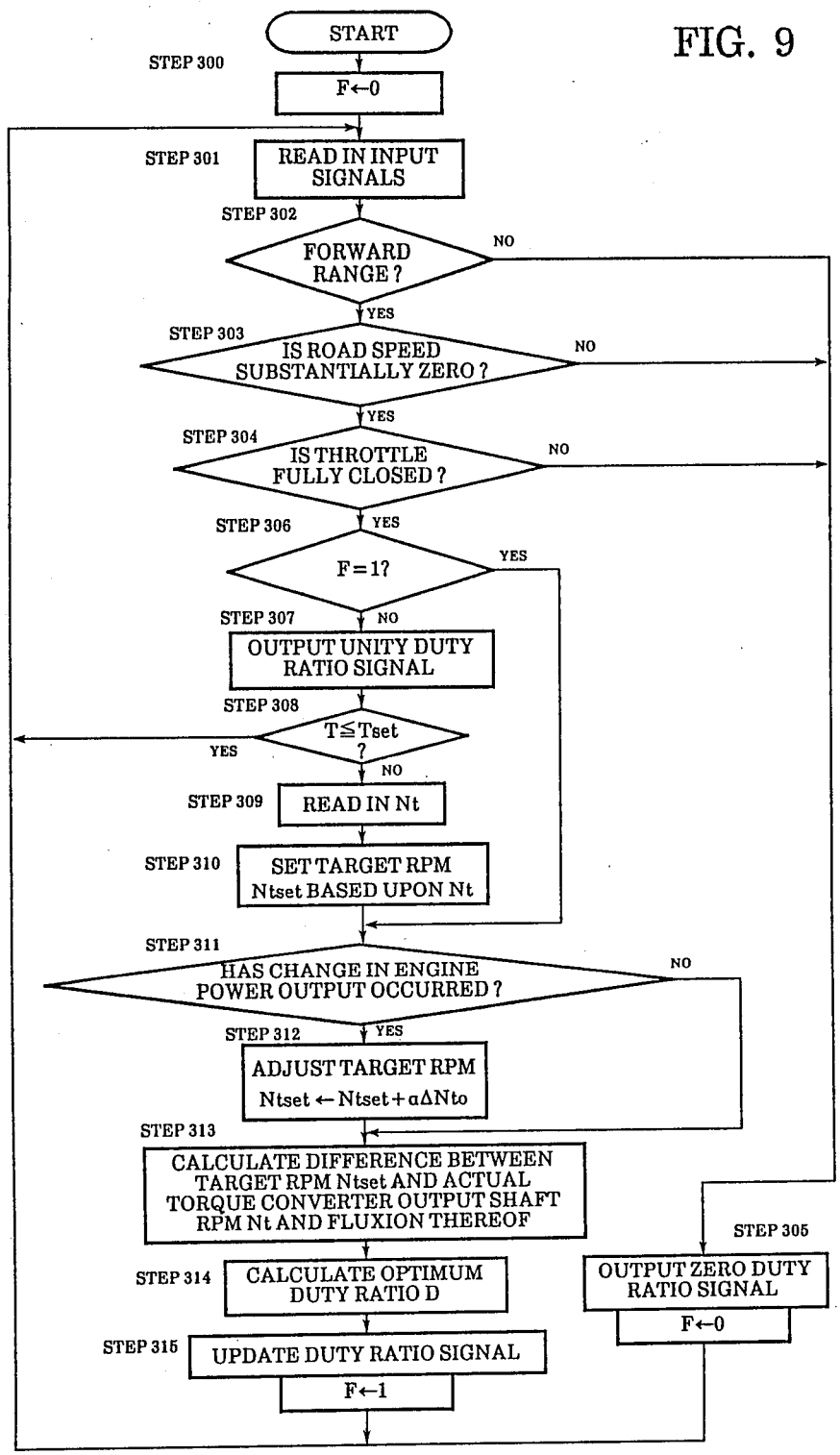
FIG. 9 is similar to FIGS. 3 and 4 for the first and second preferred embodiments and FIG. 7 for the third preferred embodiment, being a flow chart for a portion of a program executed by a microprocessor incorporated in a fifth preferred embodiment of the idling control system of the present invention, said portion again relating to anti creep idling control.

Now, the fifth preferred embodiments of the idling control system and method of the present invention will be described. In this connection, again, the gear train of the transmission which is controlled by this control system and method is the same one as described above with reference to FIG. 1; and, also, the physical components of the idling control system are substantially the same as those in the third preferred embodiment described above and shown in FIG. 5. Accordingly, these matters will not be particularly discussed, and only the flow chart of FIG. 9 for the portion of the control program executed by the microcomputer 70 which implements these fifth embodiments of anti creep control will be detailed. Again, the repetitive obeying of this routine is started once the ignition of the vehicle is turned on.

First, in the step 300, the value of a flag F is set to zero, and then the flow of control passes next to the step 301.

Next, in this step 301, the values of the various input signals from the sensors and switches are read in and are processed by A/D converters or the like, not particularly shown. Then the flow of control passes next to the step 302.

In this step 302, a test is made as to whether or not a forward driving range, i.e. "D" or drive range, "S" or second range, or "L" or low range, is selected on the manual range setting valve 42. The microcomputer 70, as before, makes this decision based upon the output of the shift position switch 73. If the result of this test is NO, i.e. the range currently selected is not one in which forward vehicle motion is possible (that is, is "P" or parking range, "N" or neutral range, or "R" or reverse range), then the flow of control passes next to the step 305; but, if the result of this test is YES, so that forward driving is currently possible, then the flow of control passes next to the step 303.

In this step 303, a test is made as to whether the vehicle road speed is currently less than a predetermined small value, or not, i.e. as to whether the vehicle is currently substantially stopped, or not. The microcomputer 70, as before, makes this decision based upon the output of the vehicle road speed sensor 72. If the result of this test is NO, i.e. the vehicle is not at this time substantially stationary, then as before the flow of control passes next to the step 305; but, if the result of this test is YES, so that the vehicle is currently substantially stopped, then the flow of control passes next to the step 304.

In this step 304, a test is made as to whether the throttle of the internal combustion engine 100 is currently fully closed, or not, i.e. as to whether the load on said engine 100 is currently substantially zero, or not. The microcomputer 70, as before, makes this decision based upon the output of the throttle opening sensor 71. If the result of this test is NO, i.e. the engine throttle is not at this time substantially fully closed, then as before the flow of control passes next to the step 305; but, if the result of this test is YES, so that the engine load is currently substantially zero, then the flow of control passes next to the step 306. At this point in the flow chart it is determined that all the conditions for providing anti creep function are present.

In the step 305, to which as explained above control is passed if anti creep control is not required to be performed for any one of several reasons as seen from the decision steps 302 through 304, an electrical pulse signal is supplied to the electromagnetic solenoid valve 55 of zero duty ratio, so that the forward clutch C1 28 is put into the condition of being fully engaged, and thus normal transmission operational mode is ensured, in other words no anti creep action is performed. And then the flag F is set to zero, and the flow of control then returns to the step 301 to cycle round again.

On the other hand, in the decision step 306, a test is made as to whether the value of the flag F is currently unity, or not. If the result of this test is YES, then the target Ntset is already set, and in such a case the flow of control passes to the step 311. On the other hand, if the result of this test is NO, then the flow of control passes next to the step 307.

In this step 307 an electrical pulse signal is supplied to the electromagnetic solenoid valve 55 of unity duty ratio, so that the forward clutch C1 28 is put into the condition of being fully disengaged, and thus maximum anti creep action is performed. This is done in order to discover what will be the rotational speed of the output shaft 9 of the fluid torque converter assembly 2 at this time. Then the flow of control passes next to the step 308.

In this step 308, a test is made as to whether the elapsed time since the step 307 was performed is less than or equal to a determinate value Tset, or not. If the answer to this test is YES, so that full disengagement of the forward clutch C1 28 has not yet been performed for the time interval Tset, then the flow of control passes next to the step 301, to cycle around this routine again. On the other hand, If the answer to this test is NO, indicating that now full disengagement of the forward clutch C1 28 has been performed over a time interval equal to Tset, then the flow of control passes next to the step 309. This interval Tset may be of the order of one second or so; inevitably there is always a time lapse of such an order before the forward clutch C1 28 becomes fully disengaged and the rotational speed of the output member of the fluid torque converter assembly 2 reaches a steady state.

In the next step 309, the actual current value Nt of said rotational speed of said output member of said fluid torque converter assembly 2 is read in, and next in the step 310 the target rotational speed value Ntset is updated based upon said value Nt. As before, this updating can be done by setting Ntset to Nt−β$\delta$Nt. And then control passes to the step 311.

In the step 311, a test is made as to whether a change in engine output power has occurred, or not. Such a change in engine output power can be one caused by the operation of an air conditioner pump, of an alternator or other engine ancillaries, or by a change in the running conditions of the engine itself, for example a power output change associated with engine warming up control parameterized by coolant temperature, or due to shifting of the manual range setting valve 42 from neutral range to drive range. In any case, if the result of this test is NO, i.e. the engine output power has not at this time substantially occurred, then the flow of control skips next to the step 313; but, if on the other hand the result of this test is YES, then the flow of control passes next to the step 312.

In this step 312, as in the third preferred embodiments, using a correction coefficient $\alpha$ according to the change in engine output, and a correction step unit $\delta$Nto (since this preferred embodiment utilizes the rotational speed of the torque converter output shaft 9), then Ntset is increased by $\alpha\delta$Nto. This correction coefficient $\alpha$ will be positive when the engine output increases, and will be negative when the engine output decreases. Next, the flow of control passes to the step 313.

In the step 313, as before, the difference $\delta$Ntset,Nt between the target rotational speed Ntset for the torque converter output shaft 9 and the actual value Nt thereof is calculated, and also the rate of change Nt thereof is calculated. Next, the flow of control passes to the step 314.

In this step 314, as before, using $\delta$Nt and Nt as obtained in the step 313, by an optimum calculation method worked out in advance by stability analysis of automatic control theory of feedback control systems, the optimum duty ratio D for the pulse signal to be supplied to the electromagnetic solenoid valve 55 is calculated. For example, this may be done according to the equation $D:=D+k1\times\delta Nt+k2\times Nt$, where k1 and k2 are optimized for control stability and response. Then the flow of control passes to the step 315.

In this step 315, as before, an electrical pulse signal is supplied to the electromagnetic solenoid valve 55 of updated duty ratio equal to the above defined newly determined optimum duty ratio value D, so that the forward clutch C1 28 is put into the condition of being operated with an appropriate torque transmission capability, in other words so that appropriate anti creep action is performed. And then the flag F is set to unity, to indicate that the duty ratio signal has been updated; and then the flow of control returns to the step 301 to cycle round again.

Thus, it is seen that in these fifth preferred embodiments, when the vehicle first comes to a halt, first the forward clutch is substantially completely disengaged for a time period Tset, and the output rotational speed of the torque converter assembly 2 is sensed at this time; and thereafter, during this halting episode, anti creep control is performed based upon this sensed value. Accordingly, even better and more sensitive and adaptive anti creep control is available according to these fifth preferred embodiments.

THE SIXTH PREFERRED EMBODIMENTS

A similar modification as that from the third to the fourth preferred embodiments may be made to get the sixth preferred embodiments from the fifth; details thereof will not be particularly explained because they will be easily supplemented by one of ordinary skill in the art, based upon the disclosure herein.

Although the present invention has been shown and described in terms of several preferred embodiments thereof, and with reference to the appended drawings, it should not be considered as being particularly limited thereby. The details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the legitimate and properly interpreted scope of the accompanying claims, which follow.

TABLE

| | C1 (28) | C2 (29) | C0 (17) | B1 (30) | B2 (31) | B0 (18) | F1 (32) | F0 (16) |
|---|---|---|---|---|---|---|---|---|
| P RANGE | X | X | O | X | X | X | F | F |
| R RANGE | X | O | O | X | O | X | F | O |
| N RANGE | X | X | O | X | X | X | F | F |
| D RANGE | | | | | | | | |

TABLE-continued

|  | C1 (28) | C2 (29) | C0 (17) | B1 (30) | B2 (31) | B0 (18) | F1 (32) | F0 (16) |
| --- | --- | --- | --- | --- | --- | --- | --- | --- |
| 1ST | O | X | O | X | X | X | O | O |
| 2ND | O | X | X | X | X | O | O | F |
| 3RD | O | X | O | O | X | X | F | O |
| 4TH | O | O | O | X | X | X | F | O |
| 5TH | O | O | X | X | X | O | F | F |
| S RANGE |  |  |  |  |  |  |  |  |
| 1ST | O | X | O | X | X | X | O | O |
| 2ND | O | X | X | X | O | O | O | F |
| 3RD | O | X | O | O | X | X | F | O |
| L RANGE |  |  |  |  |  |  |  |  |
| 1ST | O | X | O | X | O | X | O | O |
| 2ND | O | X | X | X | O | O | O | F |

What is claimed is:

1. In a vehicle comprising an engine and an automatic transmission including a fluid torque converter, a forward clutch and a manual range setting valve, a method of controlling said automatic transmission for anti creep ready-to-start temporary stop of the vehicle, comprising the steps of:
    detecting that the vehicle is substantially stopped with said manual range setting valve being set to a forward speed range,
    detecting a rotational speed associated with said fluid torque converter, and
    controlling said forward clutch by engaging said forward clutch with reference to said rotational speed associated with said fluid torque converter, to such an extent that said rotational speed associated with said fluid torque converter does not drop below a certain rotational speed value.

2. A method according to claim 1, wherein said rotational speed associated with said fluid torque converter is the rotational speed of an output member thereof.

3. A method according to claim 1, wherein said rotational speed associated with said fluid torque converter is the rotational speed of an input member thereof.

4. A method according to any one of claims 1, 2 or 3, wherein said rotational speed associated with said fluid torque converter is detected when said forward clutch is substantially disengaged, and said certain rotational speed value is determined based thereon.

5. A method according to claim 4, wherein said rotational speed associated with said fluid torque converter is detected when said manual range setting valve is set to neutral or to parking range.

6. A method according to claim 4, wherein said certain rotational speed value is determined as being less than said rotational speed associated with said fluid torque converter detected when said forward clutch is substantially disengaged by a certain amount.

7. A method according to claim 4, wherein said certain rotational speed value is adjusted during anti creep control according to fluctuations in the power output of said engine.

8. A method according to claim 7, wherein said fluctuations in the power output of said engine are due to variations of ancillary equipment load.

9. A method according to claim 7, wherein said fluctuations in the power output of said engine are due to variations of operational condition.

10. A method according to claim 4, wherein, first said forward clutch is substantially disengaged, said rotational speed associated with said fluid torque converter is detected, and said certain rotational speed value is determined based thereon, and subsequently said forward clutch is controlled so that said rotational speed associated with said fluid torque converter does not drop below said certain rotational speed value.

11. A method according to claim 10, wherein said certain rotational speed value is determined as being less than said rotational speed associated with said fluid torque converter detected when said forward clutch is substantially disengaged by a certain amount.

12. A method according to claim 10, wherein said certain rotational speed value is adjusted during anti creep control according to fluctuations in the power output of said engine.

13. A method according to claim 12, wherein said fluctuations in the power output of said engine are due to variations of ancillary equipment load.

14. A method according to claim 12, wherein said fluctuations in the power output of said engine are due to variations of operational condition.

15. The method of claim 1 wherein said controlling step includes the steps of:
    controlling a degree of engagement of said forward clutch between at least two values, said two values excluding complete engagement of said forward clutch;
    repeatedly monitoring said rotational speed associated with said fluid torque converter; and
    repeatedly selecting one of said engagement values such that said rotational speed does not drop below said certain rotational speed value.

16. In a vehicle comprising an engine and an automatic transmission including a fluid torque converter, a forward clutch and a manual range setting valve, a system for controlling said automatic transmission for anti creep ready-to-start temporary stop of the vehicle, comprising:
    first means for detecting a vehicle speed,
    second means for detecting a setting position of said manual range setting valve,
    third means for detecting a rotational speed associated with said fluid torque converter, and
    means for controlling said forward clutch with reference to said rotational speed associated with said fluid torque converter detected by said third means such that said rotational speed associated with said fluid torque converter does not drop below a certain rotational speed value when said first means is detecting that the vehicle is substantially stopped and said second means is detecting that said manual range setting valve is set to a forward speed range.

17. A system according to claim 16, wherein said rotational speed associated with said fluid torque converter is the rotational speed of an output member thereof.

18. A system according to claim 16, wherein said rotational speed associated with said fluid torque converter is the rotational speed of an input member thereof.

19. A system according to any of claims 16, 17 or 18, further comprising a means for determining said certain rotational speed value based upon said rotational speed associated with said fluid torque converter detected when said forward clutch is substantially disengaged.

20. A system according to claim 19, wherein said rotational speed associated with said fluid torque converter is detected when said manual range setting valve is set to neutral or to parking range.

21. A system according to claim 19, wherein said certain rotational speed value is determined as being less than said rotational speed associated with said fluid torque converter detected when said forward clutch is substantially disengaged by a certain amount.

22. A system according to claim 19, further comprising a means for adjusting said certain rotational speed value during anti creep control according to fluctuations in the power output of said engine.

23. A system according to claim 22, wherein said fluctuations in the power output of said engine are due to variations of ancillary equipment load.

24. A system according to claim 22, wherein said fluctuations in the power output of said engine are due to variations of operational condition.

25. A system according to claim 19, further comprising a means for first substantially disengaging said forward clutch, means for detecting said rotational speed associated with said fluid torque converter, means for determining said certain rotational speed value based thereon, and means for subsequently controlling said forward clutch so that said rotational speed associated with said fluid torque converter does not drop below said certain rotational speed value.

26. A system according to claim 25, wherein said determining means determines said certain rotational speed value as being less than said rotational speed associated with said fluid torque converter detected when said forward clutch is substantially disengaged by a certain amount.

27. A system according to claim 25, further comprising a means for adjusting said certain rotational speed value during anti creep control according to fluctuations in the power output of said engine.

28. A system according to claim 27, wherein said fluctuations in the power output of said engine are due to variations of ancillary equipment load.

29. A system according to claim 27, wherein said fluctuations in the power output of said engine are due to variations of operational condition.

30. The system of claim 16, wherein said controlling means comprise:
   means for controlling a degree of engagement of said forward clutch between at least two values, said two values excluding complete engagement of said forward clutch;
   means for repeatedly monitoring said rotational speed associated with said fluid torque converter; and
   means for repeatedly selecting one of said engagement values such that said rotational speed does not drop below said certain rotational speed value.

* * * * *